US012789373B1

(12) United States Patent
Soltani Zarrin et al.

(10) Patent No.: US 12,789,373 B1
(45) Date of Patent: Nov. 10, 2026

(54) HUMAN-MACHINE INTERFACE (HMI) DEVICE CONTROL BASED ON HUMAN STATE ESTIMATED FROM PHYSICAL HUMAN-ROBOT INTERACTION (pHRI)

(71) Applicant: Honda Motor Co., Ltd., Tokyo (JP)

(72) Inventors: Rana Soltani Zarrin, Los Gatos, CA (US); Huy Quyen Ngo, Pittsburgh, PA (US)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 19/216,109

(22) Filed: May 22, 2025

Related U.S. Application Data

(60) Provisional application No. 63/686,292, filed on Aug. 23, 2024.

(51) Int. Cl.
*B25J 9/16* (2006.01)

(52) U.S. Cl.
CPC .................................. *B25J 9/1653* (2013.01)

(58) Field of Classification Search
CPC ..................................................... B25J 9/1653
USPC ......................................................... 700/250
See application file for complete search history.

(56) References Cited

U.S. PATENT DOCUMENTS 10,504,379 B2 12/2019 Vinkers et al.
11,645,479 B1 5/2023 Coursey
11,942,075 B2 3/2024 Tumuluri
12,084,080 B2 * 9/2024 Rosman .................. G06N 3/04
2005/0271279 A1 * 12/2005 Fujimura ............... G06V 40/28 382/209
2014/0365228 A1 * 12/2014 Ng-Thow-Hing ...... G06F 3/017 704/275
2016/0285959 A1 * 9/2016 Vasko ................ G05B 19/4185
2016/0346921 A1 * 12/2016 Orman ................... B25J 9/1689
2017/0038762 A1 * 2/2017 Canedo .................. B25J 9/1674
(Continued)

FOREIGN PATENT DOCUMENTS

CN 115658963 A 1/2023
CN 116665273 A 8/2023
(Continued)

OTHER PUBLICATIONS

CN117765952.translate (Year: 2024).*
(Continued)

*Primary Examiner* — B M M Hannan
(74) *Attorney, Agent, or Firm* — Suzanne Gagnon; American Honda Motor Co., Inc.

(57) ABSTRACT

A system for control of a human-machine interface (HMI) device based on human state estimated from physical human-robot interaction (pHRI). The system receives human input parameters associated with physical interaction of the HMI device with a user, context parameters associated with a task performed by the HMI device, and parameters associated with a robot. The system applies a pHRI model on the human input parameters, the context parameters, and the robot parameters and estimates human state parameters based on the application of the pHRI model. The system also applies a behavior adaptation model on the context parameters, the human state parameters, and a budget parameter and controls a subsequent physical interaction of the HMI device with the user based on the application of the behavior adaptation model.

20 Claims, 9 Drawing Sheets

(56) References Cited

U.S. PATENT DOCUMENTS

| | | | | |
|---|---|---|---|---|
| 2021/0122045 | A1* | 4/2021 | Handa | B25J 13/084 |
| 2021/0170590 | A1* | 6/2021 | Laftchiev | B25J 9/163 |
| 2022/0241985 | A1* | 8/2022 | Scherer | B25J 11/0015 |
| 2024/0025034 | A1* | 1/2024 | Lachenmayr | B25J 3/00 |

FOREIGN PATENT DOCUMENTS

| | | | |
|---|---|---|---|
| CN | 117798914 | A | 4/2024 |
| CN | 118079182 | A | 5/2024 |
| NL | 1042811 | B1 | 10/2019 |
| WO | 2024/148737 | A1 | 7/2024 |

OTHER PUBLICATIONS

CN110000753.translate (Year: 2019).*
CN115617972.translate (Year: 2023).*
Chen, et al., "An Investigation of Responses to Robot-Initiated Touch in a Nursing Context", International Journal of Social Robotics, vol. 6, No. 1, Oct. 16, 2013, pp. 141-161.
Zheng, et al., "What Kinds of Robot's Touch Will Match Expressed Emotions?", IEEE Robotics and Automation Letters, vol. 5, No. 1, 2019, pp. 127-134.
Rubagotti, et al., "Perceived Safety in Physical Human Robot Interaction—a Survey", Robotics and Autonomous Systems, vol. 151, May 30, 2021, 23 pages.
Akalin, et al., "Do you feel safe with your robot? Factors Influencing Perceived Safety in Human-Robot Interaction based on Subjective and Objective Measures", International journal of human-computer studies, vol. 158, Oct. 16, 2021, 48 pages.
Chen, et al., "Touched by a Robot: an Investigation of Subjective Responses to Robot-initiated Touch", Proceedings of the 6th international conference on Human-robot interaction, Mar. 6-9, 2011, 8 pages.
King, et al., Towards an Assistive Robot that Autonomously Performs Bed Baths for Patient Hygiene, 2010 IEEE/ RSJ International Conference on Intelligent Robots and Systems, 2010, 6 pages.
Nanavati, et al., "Design Principles for Robot-Assisted Feeding in Social Contexts", IEEE International Conference on Human-Robot Interaction (HRI), Mar. 13-16, 2023, 10 pages.
Hu, et al., "Interact with me: an exploratory study on interaction factors for active physical human robot interaction," IEEE Robotics and Automation Letters, vol. 5, No. 4, Oct. 25-29, 2020, 8 pages.
Hu, et al., "Toward Active Physical Human—Robot Interaction: Quantifying the Human State During Interactions", IEEE Transactions on Human-Machine Systems, vol. 52, No. 3, Feb. 1, 2022, pp. 367-378.
Hoffmann, et al., "The persuasive power of robot touch-behavioral and evaluative consequences of non-functional touch from a robot", Plos one, vol. 16, No. 5, May 5, 2021, 21 pages.
Gouaillier, et al., "Mechatronic design of NAO humanoid", IEEE international conference on robotics and automation, May 12-17, 2009, pp. 769-774.
Kanda, et al., "Analysis of humanoid appearances in human-robot interaction", IEEE transactions on robotics, vol. 24, No. 3, 2008, 8 pages.
Gutman, et al., "Evaluating levels of automation in human—robot collaboration at different workload levels", Applied Sciences, vol. 11, No. 16, Aug. 10, 2021, 15 pages.
Mitsunaga, et al., "Adapting robot behavior for human-robot interaction", IEEE Transactions on Robotics, vol. 24, No. 4, Jul. 18, 2008, 07 pages.
Magyar, et al., "Proposal of a cloud-based agent for social human-robot interaction that learns from the human experimenters", IEEE 19th International Conference on Intelligent Engineering Systems, Sep. 3-5, 2015, pp. 107-111.
Ozsoydan, et al., "A reinforcement learning based computational intelligence approach for binary optimization problems: the case of the set-union knapsack problem", Engineering Applications of Artificial Intelligence, vol. 118, 2023, pp. 105688.
Thongsri, et al., "Implementation of a personalized food recommendation system based on collaborative filtering and knapsack method," International Journal of Electrical and Computer Engineering (IJECE), vol. 12, No. 1, Feb. 2022, pp. 630-638.
Beer, et al., "Toward a framework for levels of robot autonomy in human-robot interaction,", Journal of human-robot interaction, vol. 3, No. 2, Jun. 2014, 26 pages.
Hirano, et al., "How do communication cues change impressions of human—robot touch interaction?", International Journal of Social Robotics, vol. 10, Sep. 19, 2017, 11 pages.
Shiomi, et al., "Gaze-height and speech-timing effects on feeling robot-initiated touches", Journal of Robotics and Mechatronics, vol. 32, No. 1, Feb. 2020, 08 pages.
Pena, et al., "Human perception of social robot's emotional states via facial and thermal expressions", ACM Transactions on Human-Robot Interaction (THRI), vol. 9, No. 4, May 31, 2020, 19 pages.
Huy Quyen Ngo., "Human perception of robot failure and explanation", Ph.D. dissertation, Master's Thesis, Carnegie Mellon University Pittsburgh, PA, May 2024, 47 pages.
Mazursky, et al., "Physical touch from a robot caregiver: Examining factors that shape patient experience.", IEEE International conference on robot and human interactive communication (RO-MAN)., Sep. 2, 2022, 08 pages.
Martello, et al., "Algorithms for knapsack problems", North Holland Mathematics Studies, vol. 132, 1987, pp. 213-257.
A. Freville., "The multidimensional 0-1 knapsack problem: an overview", European Journal of Operational Research, vol. 155, No. 1, May 16, 2004, 1-21 pages.
Martello, et al., "Dynamic programming and strong bounds for the 0-1 knapsack problem", Management science, vol. 45, No. 3, Mar. 1, 1999, 11 pages.
Hristakeva, et al., "Solving the 0-1 knapsack problem with genetic algorithms", in Midwest instruction and computing symposium, 2004, 16-17 pages.
Rossi, et al., "How the timing and magnitude of robot errors influence peoples' trust of robots in an emergency scenario", in Social Robotics: 9th International Conference, ICSR 2017, Tsukuba, Japan, Proceedings 9. Springer,Oct. 24, 2017, 10 pages.
Haddadin, et al., "The franka emika robot: a reference platform for robotics research and education", IEEE Robotics & Automation Magazine, vol. 29, No. 2, Jun. 2022, 46-64 pages.
"QBrobotics", URL: https://qbrobotics.com/, 2011.
Bergstra, et al., "Random search for hyper-parameter optimization", Journal of machine learning research, vol. 13, No. 2, Feb. 2012, 25 pages.
Leo Breiman, "Random forests", Machine learning, vol. 45, Jan. 2001, 33 pages.
Williams, et al., "Gaussian processes for regression", Advances in neural information processing systems, vol. 8, 1995, 07 pages.
Basak, et al., "Support vector regression", Neural Information Processing-Letters and Reviews, vol. 11, No. 10, 2007, 203-224 pages.
Han, et al., "The need for verbal robot explanations and how people would like a robot to explain itself", ACM Transactions on Human-Robot Interaction (THRI), vol. 10, No. 4, Sep. 14, 2021, 43 pages.
Rawal, et al., "Facial emotion expressions in human-robot interaction: a survey", International Journal of Social Robotics, vol. 14, No. 7, Mar. 12, 2021, 22 pages.
Kshirsagar, et al., "Robot gaze behaviors in human-to-robot handovers", IEEE Robotics and Automation Letters, vol. 5, No. 4, Oct. 25-29, 2020, 7 pages.
Bartneck, et al., "Measurement instruments for the anthropomorphism, animacy, likeability, perceived intelligence, and perceived safety of robots", International journal of social robotics, vol. 1, 2009, 12 pages.
Carpinella, et al., "The robotic social attributes scale (rosas) development and validation", in Proceedings of the 2017 ACM/IEEE International Conference on human-robot interaction, Mar. 9, 2017, pp. 254-262.
Joshi, et al., "Likert scale: Explored and explained", British journal of applied science & technology, vol. 7, No. 4, Feb. 20, 2015, 08 pages.

(56) References Cited

OTHER PUBLICATIONS

He, et al., "Deep residual learning for image recognition", in Proceedings of the IEEE conference on computer vision and pattern recognition, Dec. 10, 2015, 12 pages.
Huang, et al., "Tabtransformer: Tabular data modeling using contextual embeddings", Dec. 11, 2020, 17 Pages.
Arik, et al., "Tabnet: Attentive interpretable tabular learning", in Proceedings of the AAAI conference on artificial intelligence, vol. 35, No. 8, Dec. 9, 2020, 13 pages.
Chen, et al., "Xgboost: a scalable tree boosting system," in Proceedings of the 22nd acm sigkdd international conference on knowledge discovery and data mining, Jun. 10, 2016, 13 pages.
Ke, et al., "Lightgbm: a highly efficient gradient boosting decision tree" 31st Conference on Neural Information Processing Systems (NIPS 2017), 2017, 09 pages.
Lundberg, et al., "A unified approach to interpreting model predictions", Nov. 25, 2017, 10 pages.
Grinsztajn, et al., "Why do tree-based models still outperform deep learning on typical tabular data?", Advances in neural information processing systems, vol. 35, Jul. 18, 2022, 33 pages.
Shwartz-Ziv, et al., "Tabular data: Deep learning is not all you need", Information Fusion, vol. 81, Nov. 23, 2021, 13 pages.
Lewis, et al., "The role of trust in human-robot interaction" Foundations of trusted autonomy, Jan. 16, 2018, 25 pages.
Koay, et al., "Living with robots: Investigating the habituation effect in participants' preferences during a longitudinal human-robot interaction study," 16th IEEE International Symposium on Robot and Human Interactive Communication. IEEE, Aug. 26-29, 2007, pp. 564-569.
Tao, et al., "A behavior adaptation method for an elderly companion robot—rui", International Conference on Social Robotics, Springer, 2010, pp. 141-150.
Sartaj Sahni, et al., "Approximate Algorithms for the 0/1 Knapsack Problem", Journal of the ACM (JACM), vol. 22, No. 1, Jan. 1, 1975, pp. 115-124.
Kahneman, et al., "Prospect theory: an analysis of decision under risk", Handbook of the fundamentals of financial decision making: Part I. World Scientific, vol. 47, No. 2, Mar. 1979, pp. 263-291.
Akalin, et al., "A Taxonomy of Factors Influencing Perceived Safety in Human-Robot Interaction", International Journal of Social Robotics, vol. 15, No. 12, 2023, pp. 1993-2004.
Nikolaidis, et al., "Planning with Verbal Communication for Human-Robot Collaboration", ACM Transactions on Human-Robot Interaction (THRI), vol. 7, No. 3, Jun. 14, 2017, 17 pages.
Grigore, et al., "Talk to me: Verbal communication improves perceptions of friendship and social presence in human-robot interaction", 16th International Conference, IVA 2016, Los Angeles, CA, USA, Sep. 20-23, 2016, Proceedings 16. Springer, 2016, pp. 51-63.
Maggioni, et al., "If it Looks like a Human and Speaks like a Human . . . Dialogue and cooperation in human-robot interactions", Journal of Behavioral and Experimental Economics, vol. 104, May 14, 2021, 60 pages.
Sture Holm, "A Simple Sequentially Rejective Multiple Test Procedure", Scandinavian Journal of Statistics, vol. 6, No. 2, 1979, pp. 65-70.
Admoni, et al., "Modeling communicative behaviors for object references in human-robot interaction", IEEE International Conference on Robotics and Automation (ICRA), IEEE, May 16, 2016, pp. 3352-3359.
Tsarouchi, et al., "Human-robot interaction review and challenges on task planning and programming", International Journal of Computer Integrated Manufacturing, vol. 29, No. 8, 2016, pp. 916-931.

* cited by examiner

HUMAN-MACHINE INTERFACE (HMI) DEVICE CONTROL BASED ON HUMAN STATE ESTIMATED FROM PHYSICAL HUMAN-ROBOT INTERACTION (pHRI)

CROSS-REFERENCE TO RELATED APPLICATION

This Application also makes reference to U.S. Provisional Application Ser. No. 63/686,292, which was filed on Aug. 23, 2024. The above stated Patent Application is hereby incorporated herein by reference in its entirety.

BACKGROUND

The rapid advancements in engineering and technology have given rise to a diverse array of human-machine interface (HMI) devices, including robots, which are now integral to executing complex tasks, such as human-robot interactions. The interaction of the human with the robot may happen in a variety of contexts, from instrumental for medical reasons to affectionate for social reasons. Enabling robots to make similar physical interactions with humans may transcend physical limitations associated with human-human interaction and augment human capabilities. However, the integration of robots also presents new challenges, including perception and interpretation issues, context awareness issues, technical issues, and the necessity for social acceptance of robots. Current robotic systems may lack emotional intelligence that humans possess, making it difficult for them to gauge the right moment and manner to initiate touch. This may be achieved by developing algorithms that can simulate emotional intelligence which is a complex task and increases time and effort. Moreover, these systems might only be able to measure human states and perception in a single context with one particular robot and around some specific robot parameters and user backgrounds, due to which the systems are unable to quantitatively output the human state in general physical human-robot interaction scenarios within the variety of contexts. Also, it is essential to address these gaps to enhance the operational efficiency and efficacy of robotic applications in sensitive settings, like the human-robot interactions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for control of a human-machine interface (HMI) device based on human state estimated from physical human-robot interaction (pHRI) includes circuitry configured to receive human-input parameters associated with a physical interaction of the HMI device with a user, context parameters associated with a task performed by the HMI device based on the physical interaction of the HMI device with the user, and robot parameters associated with a robot coupled with the HMI device. Further, the circuitry is configured to apply a physical human-robot interaction (pHRI) model on the human input parameters, the context parameters, and the robot parameters and to estimate human state parameters based on the application of the pHRI model. Further, the circuitry is configured to apply a behavior adaptation model on the context parameters, the human state parameters, and a budget parameter and to control a subsequent physical interaction of the HMI device with the user based on the application of the behavior adaptation model.

According to another embodiment of the disclosure, a method for control of human-machine interface (HMI) device based on human state estimated from physical human-robot interaction (PHRI) includes receiving human input parameters associated with a physical interaction of the HMI device with the user, context parameters associated with a task performed by the HMI device based on the physical interaction of the HMI device with the user, and robot parameters associated with a robot coupled with the HMI device. Further, the method includes applying a pHRI model on the human input parameters, the context parameters, and the robot parameters and estimating human state parameters based on the application of the pHRI model. Further, the method includes applying a behavior adaptation model on the context parameters, the human state parameters, and a budget parameter and controlling a subsequent physical interaction of the HMI device with the user based on the application of the behavior adaptation model.

According to another embodiment of the disclosure, a non-transitory computer-readable medium may have stored thereon computer implemented instructions that, when executed by an electronic device, causes the electronic device to execute operations receiving human input parameters associated with a physical interaction of a human-machine interface (HMI) device with a user, context parameters associated with a task performed by the HMI device based on the physical interaction of the HMI device with the user, and robot parameters associated with a robot coupled with the HMI device. The operations further include applying a physical human-robot interaction (pHRI) model on the human input parameters, the context parameters, and the robot parameters and estimating human state parameters based on the application of the pHRI model. The operations further include applying a behavior adaptation model on the context parameters, the human state parameters, and a budget parameter and controlling a subsequent physical interaction of the HMI device with the user, based on the application of the behavior adaptation model.

DETAILED DESCRIPTION

Figure 1:
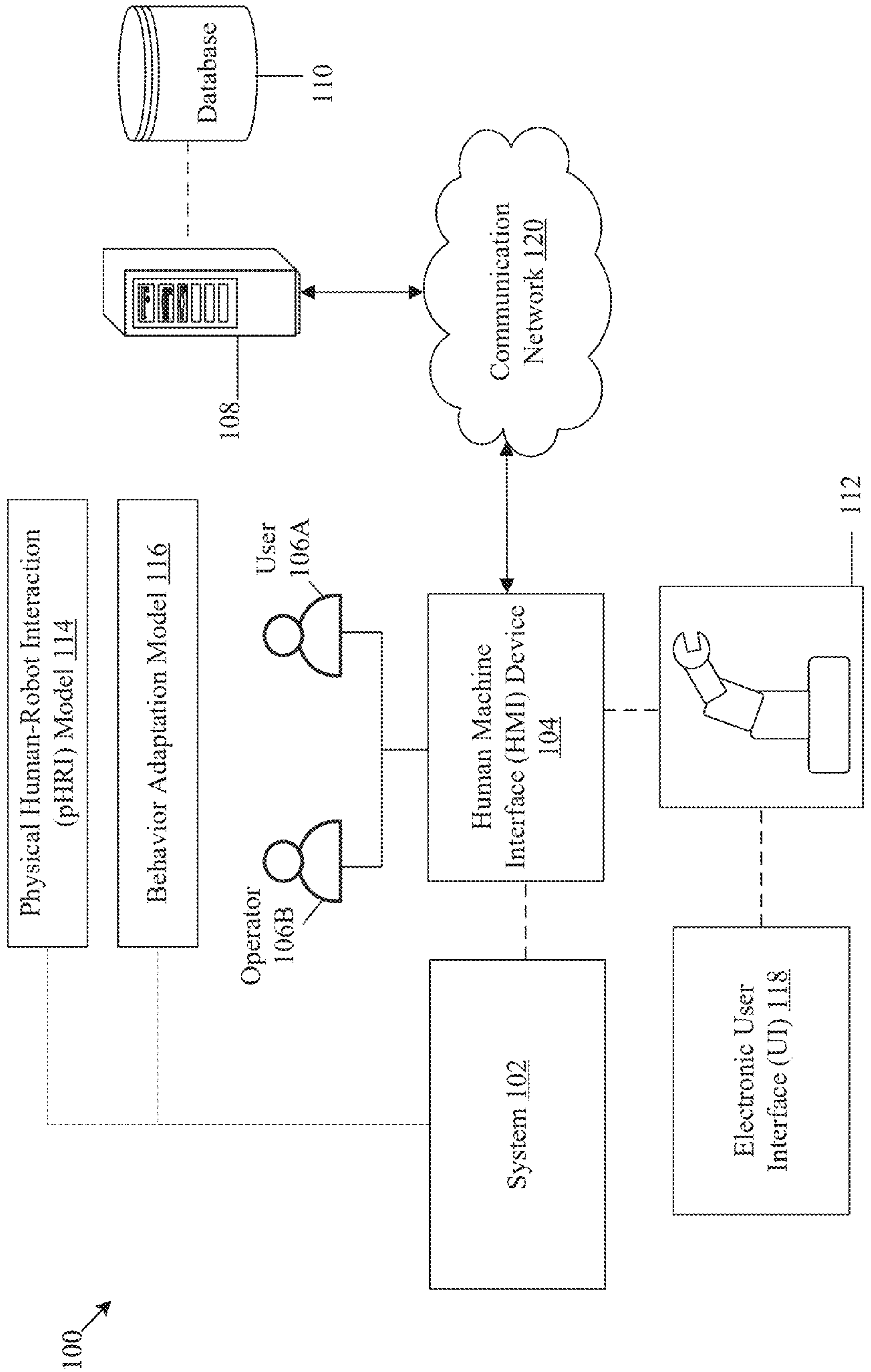
FIG. 1 is a diagram that illustrates an exemplary network environment for control of a human-machine interface (HMI) device based on human state estimated from physical human-robot interaction (pHRI), in accordance with an embodiment of the disclosure.

The following described implementation may be found in an electronic device and method for control of a human-machine interface (HMI) device based on the human state estimated from the physical human-robot interaction (pHRI). Exemplary aspects of the disclosure may provide an electronic device (e.g., a mobile phone, a smart phone, a desktop, a laptop, a personal computer, and the like) that may receive human input parameters (e.g., a human background and a set of responses) associated with a physical interaction of an HMI device (e.g., robots) with a user. Next, the electronic device may receive context parameters (e.g., a task context and a level of emergency) associated with a task. Further, the electronic device may receive robot parameters (e.g., a set of robot attributes and robot behavior) associated with the robot coupled with the HMI device. The electronic device may apply the pHRI model to the human input parameters, the context parameters, and the robot parameters. Also, the electronic device may estimate human state parameters based on the application of the pHRI model. The electronic device may apply a behavior adaptation model on the context parameters, the human state parameters, and a budget parameter. Furthermore, the electronic device may control a subsequent physical interaction of the HMI device with the user, further based on the application of the behavior adaptation model.

Existing physical human-robot interaction systems often face challenges in accurately perceiving and responding to human states across diverse interaction scenarios. Current solutions typically rely on predefined interaction models that may not adequately account for individual user preferences, contextual factors, or dynamic changes in the interaction environment. These limitations can result in suboptimal performance, reduced user comfort, and potential safety concerns. There is a need for a more adaptive and responsive physical human-robot interaction system that can handle a wide range of user characteristics, task contexts, and robot configurations while maintaining safety, comfort, and effectiveness of interactions.

The disclosed perception-based interaction adaptation system utilizes a combination of human input parameters, context parameters, and robot parameters to dynamically adjust robot behavior during physical interactions. Unlike traditional systems, this approach employs a physical human-robot interaction (pHRI) model to estimate human state parameters, which are then used in conjunction with a behavior adaptation model to control the HMI device's interactions. The disclosed system offers several advantages, including improved adaptability to individual user characteristics and preferences, enhanced responsiveness to changing task contexts and emergency levels, and the ability to optimize robot behavior based on both human state and system constraints. This comprehensive approach may lead to more natural, effective, and user-friendly physical human-robot interactions across various applications and environments.

FIG. 1 is a diagram that illustrates an exemplary network environment for control of a human-machine interface (HMI) device based on human state estimated from physical human-robot interaction (pHRI), in accordance with an embodiment of the disclosure. With reference to FIG. 1, there is shown a network environment 100, which may include a system 102, a Human Machine Interface (HMI) device 104, a server 108, a database 110, a robot 112, a physical human-robot interaction (pHRI) model 114, a behavior adaptation model 116, and a communication network 120. The system 102, the HMI device 104, and the server 108 may communicate with one another through one or more networks (such as the communication network 120). The server 108 may be associated with the database 110. In FIG. 1, there is also shown, a user 106A and an operator 106B associated with (or who may operate) the system 102 and/or the HMI device 104. Though only one user (i.e., the user 106A) and only one operator (i.e., the operator 106B) is shown in FIG. 1, the scope of the disclosure may not be so limited. In some embodiments, the operator 106B may be, for example, a remote operator may be associated with the system 102. Further, the user 106A may be (different from the operator), for example, an end-user, such as, any person, associated with (or may interact with) the HMI device 104. The HMI device 104 may be associated with an electronic User Interface (UI) 118. The system 102 may, additionally or alternatively, be associated with the electronic UI 118.

The system 102 may include suitable logic, circuitry, interfaces, and/or code that may be configured to receive human input parameters (e.g., a human background associated with the user 106A, or a set of human responses of the user 106A to the physical interaction of the HMI device 104 with the user 106A), context parameters (e.g., a task context, or a level of emergency associated with the task), and robot parameters (e.g., a set of robot attributes, or a robot behavior associated with the robot 112). The human input parameters may be associated with a physical interaction of the HMI device 104 with the user 106A. Further, the context parameters may be associated with the task performed by the HMI device 104 based on the physical interaction of the HMI device 104 with the user 106A. Further, the robot parameters may be associated with the robot 112 coupled with the HMI device 104. The system 102 may apply the pHRI model 114 on the human input parameters, the context parameters, and the robot parameters. The system 102 may estimate human state parameters based on the application of the pHRI model 114. The system 102 may apply the behavior adaptation model 116 on the context parameters, the human state parameters and a budget parameter. The budget parameter may include at least one of a time budget or a processing cost budget. The system 102 may control a subsequent physical interaction of the HMI device 104 with the user 106A, further based on the application of the behavior adaptation model 116. In an example, the electronic UI 118 may be hosted on the HMI device 104. The system 102 may transmit instructions to the HMI device 104 to control the rendering of the electronic UI 118. Examples of the system 102 may include, but may not be limited to, a desktop, a tablet, a television (TV), a laptop, a computing device, a smartphone, a cellular phone, a mobile phone, a consumer electronic (CE) device having a display.

The HMI device 104 may include suitable logic, circuitry, interfaces, and/or code that may be configured to perform a predetermined set of actions that may involve a physical interaction of the HMI device 104 (and/or the robot 112) with the user 106A, based on human input parameters, context parameters, robot parameters, human state parameters, and budget parameters. The operations of the HMI device 104 may be controlled based on the human input parameters, the context parameters, the robot parameters, the human state parameters, and the budget parameter. In an example, the HMI device 104 may host an electronic UI (such as, the electronic UI 118). The electronic UI 118 may enable reception of the human input parameters, the context parameters, and the robot parameters. Based on the reception of the various parameters, physical interactions of the HMI device 104 with the user 106A may be controlled. The HMI device 104 may apply the pHRI model 114 to the human input parameters, the context parameters, and the robot parameters. The HMI device 104 may estimate the human state parameters based on the application of the pHRI model 114. The HMI device 104 may apply the behavior adaptation model 116 on the context parameters, the human state parameters, and the budget parameter. A subsequent physical interaction of the HMI device 104 with the user 106A may be controlled, based on the application of the behavior adaptation model 116. Examples of the HMI device 104 may include, but may not be limited to, a robotic arm, a humanoid, a human-interfaced machine, an industrial machine, or any device including software and hardware for touch-based human-machine interaction.

The server 108 may include suitable logic, circuitry, interfaces, and/or code configured to receive requests from the system 102 to receive input parameters from the user 106A. The server 108 may be configured to extract input parameters (e.g., human input parameters) associated with the physical interaction of the HMI device 104 with the user 106A. Further, the server 108 may be configured to extract user input indicative of the parameters (e.g., context parameters) based on the physical interaction of the HMI device 104 with the user 106A. The server 108 may be configured to extract input parameters (e.g., robot parameters) associated with the robot 112 coupled with the HMI device 104. The robot parameters may be determined based on the control of the rendering of the electronic UI (e.g., electronic UI 118). The server 108 may be configured to apply the pHRI model 114 on the human input parameters, the context parameters, and the robot parameters, to estimate the human state parameters based on the application of the pHRI model 114. The server 108 may also apply the behavior adaptation model 116 on the context parameters, the human state parameters, and the budget parameter. The server 108 may control a subsequent the physical interaction of the HMI device 104 with the user 106A, based on the application of the behavior adaptation model 116.

The server 108 may execute operations through web applications, cloud applications, HTTP requests, repository operations, file transfer, and the like. Example implementations of the servers 108 may include, but are not limited to, a database server, a file server, a web server, an application server, a mainframe server, a cloud computing server, or a combination thereof. In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the system 102 as separate entities.

The database 110 may include suitable logic, circuitry, interfaces, and/or code configured to store information such as various parameters (the human input parameters, the context parameters, and the robot parameters) received from the user 106A or the operator 106B. Further, the database 110 may store information associated with instructions associated with operation of the HMI device 104. For example, the database 110 may store a mapping table including predefined instructions associated with different values of the parameters to control the operations of the HMI device 104. The database 110 may be derived from data of a relational or non-relational database or a set of comma-separated values (csv) files in conventional or big-data storage. The database 110 may be stored or cached on device or server, such as the server 108. The device storing the database 110 may be configured to query the database 110 for certain information (such as, the information related to various parameters (e.g., the human input parameters, the context parameters, the robot parameters, information related to the task performed by the HMI device 104, and the information related to the mapping table) based on reception of a request for the particular information from the system 102. In response, the device storing the database 110 may be configured to retrieve from the database 110, results (e.g., a user input of the parameters, a task performed by the HMI device 104, and/or the mapping table) based on the received query.

In some embodiments, the database 110 may be hosted on the server 108 located at same or different locations. The operations of the database 110 may be implemented using hardware including a processor, a microprocessor (e.g., to perform or control performance of one or more operations), a field-programmable gate array (FPGA), or an application-specific integrated circuit (ASIC). In some other instances, the database 110 may be implemented using software.

The pHRI model 114 may be a human perception model configured to estimate a human state during physical human-robot touch interactions, based on the human input parameters, the context parameters, and the robot parameters. The pHRI model 114 may leverage human models to understand and manipulate human performance and enhance capabilities of the robot 112 for improvement in human modeling, to facilitate new insights and understanding into the structures or behavior underlying human biomechanics. The pHRI model 114 may be a neural network having a plurality of layers with each layer forming a loop where the outputs of each element feed into the other element, gradually improving both human understanding and robot control. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the neural network of the pHRI model 114 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layers (e.g., previous layer) of the neural network. All or some of the nodes of the neural network may correspond to same or a different mathematical function.

In an embodiment, the pHRI model 114 may be designed to understand and interpret physical interactions between the user 106A and the robot 112. For example, the pHRI model 114 may integrate various sensors, data processing techniques, control strategies, and safety mechanisms to enable safe, effective, and intuitive interactions between the user 106A and the robot 112. Different factors and considerations may be involved in training of the pHRI model 114 such as sensing and data acquisition, signal processing, modeling human dynamics, interaction control, safety mechanisms, learning and adaptation, human factors, and communication modes. In some embodiments, the pHRI model 114 may be a neural language model, such as a transformer-based decoder-only model, an encoder-decoder model (that uses transformers), or a model that uses neural networks other than transformers. In these or other embodiments, the pHRI model 114 may include multiple encoders specialized for processing different data modalities (such as text or image). The pHRI model 114 may include a Fusion mechanism to integrate the outputs from various encoders.

In training of the pHRI model 114, one or more parameters of each node of the neural network of the pHRI model 114 may be updated based on whether an output of the final layer for a given input (from the training dataset) matches a correct result based on a loss function for the neural network. The above process may be repeated for same or a different input until a minima of loss function may be achieved and a training error may be minimized. Several methods for training are known in art, for example, gradient descent, stochastic gradient descent, batch gradient descent, gradient boost, meta-heuristics, and the like.

The pHRI model 114 may include electronic data, which may be implemented as, for example, a software component of an application executable on the system 102. The pHRI model 114 may rely on libraries, external scripts, or other logic/instructions for execution by a processing device. The pHRI model 114 may include code and routines configured to enable a computing device to perform one or more operations. Additionally, or alternatively, the pHRI model 114 may be implemented using hardware including a processor, a microprocessor (e.g., to perform or control performance of one or more operations), a field-programmable gate array (FPGA), or an application-specific integrated circuit (ASIC). Alternatively, in some embodiments, the pHRI model 114 may be implemented using a combination of hardware and software.

In an embodiment, the pHRI model 114 may be designed based on sensory information obtained by the robot 112 and do not require human wearable sensors. Inputs to the pHRI model 114 may be obtainable through computer vision, brief pre-screen questions, and internal robot parameters. Further, the pHRI model 114 may be designed based on the human input parameters and the robot parameters. The human input parameters may include at least one of a human background associated with the user 106A, or a set of human responses of the user 106A to the physical interaction of the HMI device 104 with the user 106A. The robot parameters may include at least one of a set of robot attributes associated with the robot 112, or a robot behavior associated with the robot 112.

The pHRI model 114 may be a machine learning (ML) model that includes electronic data, which may be implemented as, for example, a software component of an application executable on the system 102. The ML model may rely on libraries, external scripts, or other logic/instructions for execution by a processing device. The ML model may include code and routines configured to enable a computing device, such as the system 102 to perform one or more operations such as, reception of the human input parameters, reception of context parameters, reception of robot parameters, application of the pHRI model 114, estimation of the human state parameters, application of the behavior adaptation model 116, and control of a subsequent physical interaction of the HMI device 104 with the user 106A.

The behavior adaptation model 116 may correspond to a dynamic programming model associated with a knapsack optimization technique. The behavior adaptation model 116 may be designed to enable the robot 112 to adjust robot action and response based on the environment, tasks, and interactions with the user 106A. The behavior adaptation model 116 may be a robot behavior adaptation model that integrates sensing, data processing, learning, decision-making, interaction, and safety mechanisms to enable the robot 112 to adapt its behavior dynamically. This adaptability may be crucial for the robot 112 to operate effectively in dynamic and unpredictable settings, perform complex tasks, and interact seamlessly with the user 106A. The behavior adaptation model 116 may be designed to understand and interpret physical interactions between the user 106A and the robot 112. For example, the behavior adaptation model 116 may be designed to recommend the robot behavior based on human background, task context, and human state. Different factors and considerations may be involved in training of the behavior adaptation model 116 such as sensing and data perception, data processing and interpretation, robot behavior modeling, learning and adaptation, decision making, interaction and communication, safety and reliability, and continued evaluation and improvement.

In an embodiment, the behavior adaptation model 116 may be a regression model that learns the costs and benefits associated with each behavior of the robot 112 based on the human background, the task context, and current human state. The estimated costs and benefits of robot behaviors along with a budget value may be passed to a Knapsack-based optimization solver to generate behavior adaptations for robot communication behaviors and robot parameters. The recommended behaviors may then be executed and fed back into the pHRI Model 114 for the next iteration. The behavior adaptation model 116 may be formulated as a Knapsack optimization problem that recommends robot behaviors based on the human background, the task context, and the current human state. For example, human preferences for a particular robot behavior may be captured by human's perceived safety, comfort, and intuitiveness ratings of the robot behavior and costs represented by time consumption and interruption of the robot behavior to humans. In order to improve human's perception of interaction, a set of behaviors may be generated by the behavior adaptation model 116 that maximizes total sum of benefits and costs, while performing the behaviors within a certain time.

The behavior adaptation model 116 may include electronic data, which may be implemented as, for example, a software component of an application executable on the system 102. The behavior adaptation model 116 may rely on libraries, external scripts, or other logic/instructions for execution by a processing device. The behavior adaptation model 116 may include code and routines configured to enable a computing device to perform one or more operations. Additionally, or alternatively, the behavior adaptation model 116 may be implemented using hardware including a processor, a microprocessor (e.g., to perform or control performance of one or more operations), a field-programmable gate array (FPGA), or an application-specific integrated circuit (ASIC). Alternatively, in some embodiments, the behavior adaptation model 116 may be implemented using a combination of hardware and software.

The electronic UI 118 may include suitable logic, circuitry, interfaces, and/or code configured to facilitate user interaction with the HMI device 104. The electronic UI 118 may display real-time information about system (e.g., the robot 112 and/or the HMI device 104) status, including current robot parameters, human state parameters, and context parameters. For example, the electronic UI 118 may present a dynamic dashboard showing robot joint positions, end-effector forces, user heart rate, and task progress indicators. In some respects, the electronic UI 118 may accept user input for adjusting system settings, initiating or terminating interaction sessions, or modifying robot behavior parameters. Users may input force thresholds, preferred interaction speeds, or task-specific constraints through intuitive sliders or numerical input fields. The electronic UI 118 may provide visual, auditory, or haptic feedback to confirm user actions and convey important system notifications. For instance, the electronic UI 118 may emit a subtle vibration when the robot successfully completes a task or display a color-coded alert when safety limits are approached.

The electronic UI 118 may be implemented in various forms, such as a touchscreen display integrated into the HMI device 104, a separate control panel with physical buttons and LED indicators, or a voice-activated interface that allows hands-free operation. In the case of a touchscreen display, the electronic UI 118 may feature a customizable widget-based layout where users can drag and drop modules displaying different system parameters or control options. The separate control panel implementation may include programmable function keys that can be assigned to frequently used commands or macros, enhancing operational efficiency in industrial settings. Voice-activated interfaces may utilize natural language processing to interpret complex commands, allowing users to adjust robot behavior or query system status using conversational language.

In some embodiments, the electronic UI 118 may be configured to remotely monitor and control capabilities of the HMI device 104 and/or the robot 112, allowing operators to supervise multiple HMI devices from a centralized workstation. The design of the electronic UI 118 may incorporate adaptive features that adjust the interface layout or available options based on the current context parameters or user preferences stored in a memory. For example, in an emergency scenario, the electronic UI 118 may automatically prioritize critical control functions and safety-related information, temporarily hiding lesser essential features. Additionally, the electronic UI 118 may include visualization tools for displaying complex data, such as graphical representations of the outputs of the pHRI model 114 outputs or decisions of the behavior adaptation model 116, enabling operators to better understand and fine-tune the system's performance. These visualizations may include 3D renderings of robot-human interaction spaces, force vector displays, or heat maps indicating areas of frequent contact or potential collision risks. The electronic UI 118 may also provide trend analysis tools, allowing users to track changes in interaction patterns or system performance over time.

The electronic UI 118 may offer multi-modal interaction options to accommodate various user needs and environmental conditions. For instance, in noisy industrial environments, the electronic UI 118 may emphasize visual and haptic feedback, while in laboratory settings, it may leverage more detailed auditory cues. To enhance accessibility, the electronic UI 118 may include features such as high-contrast color schemes, text-to-speech functionality for system messages, and support for external assistive devices. In scenarios involving collaborative tasks, the electronic UI 118 may provide split-screen functionality, allowing human operators and robot systems to share information and coordinate actions in real-time. The electronic UI 118 may also incorporate augmented reality (AR) elements, overlaying digital information onto a physical workspace to guide users through complex procedures or highlight potential hazards.

The electronic UI 118 may integrate with other system components to provide a cohesive user experience. For example, it may interface with sensors of the HMI device 104 to display real-time force feedback or proximity warnings. The electronic UI 118 may also connect to the database 110, allowing users to access historical interaction data, load pre-configured robot behaviors, or save custom settings for future use. To support continuous improvement of the HMI device 104, the electronic UI 118 may include built-in feedback mechanisms. Users may be prompted to rate their experience after completing tasks, provide suggestions for UI improvements, or report any issues encountered during operation. Such feedback may be analyzed to refine the behavior adaptation model 116 and enhance overall system usability.

The communication network 120 may include a communication medium through which the system 102, the HMI device 104, and the server 108 may communicate with each other. The communication network 120 may be a wired or wireless communication network. Examples of the communication network 120 may include, but are not limited to, Internet, a cloud network, Cellular or Wireless Mobile Network (such as Long-Term Evolution and 5th Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 120, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to receive the human input parameters associated with a physical interaction of the HMI device 104 with the user 106A. In an embodiment, the human input parameters may include a human background associated with the user 106A, or a set of human responses of the user 106A to the physical interaction of the HMI device 104 with the user 106A. The reception of the human input parameters is described further, for example, in FIG. 4 (at 402).

The system 102 may be configured to receive the context parameters associated with the task performed by the HMI device 104 based on the physical interaction of the HMI device 104 with the user 106A. In an embodiment, the context parameters may include at least one of a task context associated with the task, or a level of emergency associated with the task. The task context may include at least one of an instrumental context associated with the task, or an affective context associated with the task. The reception of the context parameters is described further, for example, in FIG. 4 (at 404).

The system 102 may be configured to receive the robot parameters associated with the robot 112 coupled with the HMI device 104. The robot parameters may include at least one of a set of robot attributes associated with the robot 112, or a robot behavior associated with the robot 112. The set of robot attributes may include at least one of a form factor, a level of autonomy, or degrees of freedom associated with the robot 112. The robot behavior associated with the robot 112 may include at least one of a contact conformity of the robot 112, a force applied by the robot 112, a speed of the robot 112, a touch location of the robot 112 on a body part of the user 106A, a trajectory of motion of the robot 112, or a level of communication of the robot 112. The reception of the robot parameters is described further, for example, in FIG. 4 (at 406).

The system 102 may be configured to apply the physical human-robot interaction (pHRI) model 114 on the human input parameters, the context parameters, and the robot parameters. The application of the pHRI model is described further, for example, in FIG. 4 (at 408).

The system 102 may be configured to estimate the human state parameters based on the application of the pHRI model 114. The human state parameters may correspond to at least one of a level of perceived safety, a level of perceived comfort, or a level of perceived trust of the physical interaction for the user 106A. The estimation of the human state parameters is described further, for example, in FIG. 4 (at 410).

The system 102 may be configured to apply the behavior adaptation model 116 on the context parameters, the human state parameters, and a budget parameter. The behavior adaptation model 116 may be configured to select a robot behavior based on the human state parameters and the budget parameter. The budget parameter may include at least one of a time budget or a processing cost budget. The control of the HMI device 104 may be further based on the selected robot behavior. The application of the behavior adaptation model is described further, for example, in FIG. 4 (at 412).

The system 102 may control a subsequent physical interaction of the HMI device 104 with the user 106A, based on the application of the behavior adaptation model 116. The system 102 may transmit instructions to the HMI device 104 to control the subsequent physical interaction of the HMI device 104 with the user 106A. For example, the system 102 may determine a set of instructions associated with the physical interaction, based on the received human input parameters, the context parameters, and the robot parameters. Thereafter, the system 102 may transmit the determined set of instructions to the HMI device 104 to control an operation of the HMI device 104 and thereby control the physical interaction of the HMI device 104 with the user 106A. The control of the physical interaction of the HMI device is described further, for example, in FIG. 4 (at 414).

Figure 2:
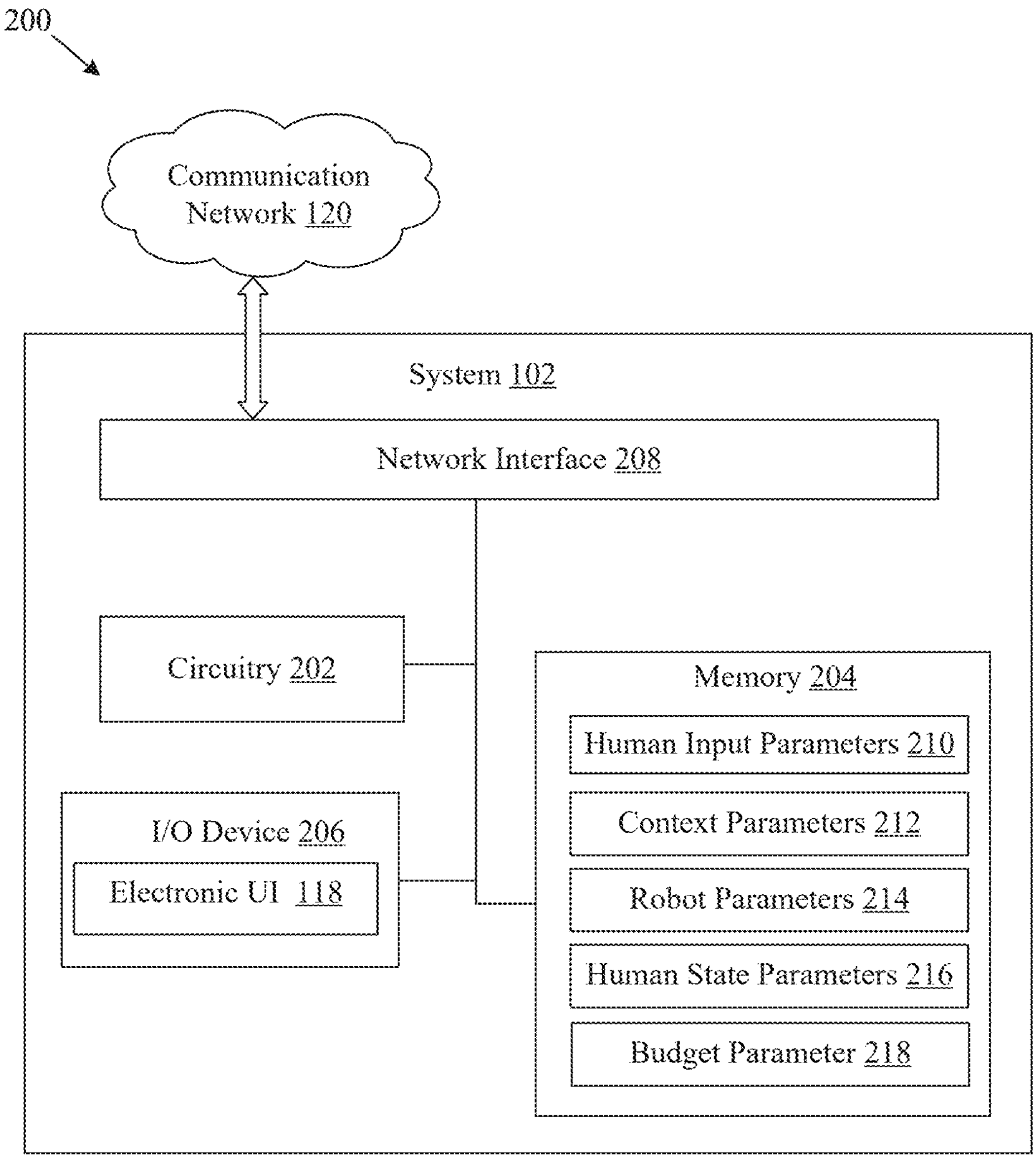
FIG. 2 is a block diagram that illustrates an exemplary system of FIG. 1, for control of the HMI device based on the human state estimated from the pHRI, in accordance with an embodiment of the disclosure.

FIG. 2 is a block diagram that illustrates an exemplary system of FIG. 1, for control of the HMI device based on the human state estimated from the pHRI, in accordance with an embodiment of the disclosure. FIG. 2 is explained in conjunction with elements from FIG. 1. With reference to FIG. 2, there is shown a block diagram 200 of the system 102, which may include a circuitry 202, a memory 204, an input/output (I/O) device 206, and a network interface 208. In at least one embodiment, the I/O device 206 may also include the electronic user interface (UI) 118. In at least one embodiment, the memory 204 may include parameters (e.g., human input parameters 210, context parameters 212, robot parameters 214, human state parameters 216, and budget parameter 218). The circuitry 202 may be communicatively coupled to the memory 204, the I/O device 206, the network interface 208, through wired or wireless communication of the system 102.

The circuitry 202 may include suitable logic, circuitry, and interfaces that may be configured to execute program instructions associated with different operations to be executed by the system 102. The operations may include controlling a physical interaction of the HMI device 104 with the user 106A based on the application of the behavior adaptation model 116 on the received context parameters 212, the human state parameters 216, and the budget parameter 218. The operations may further include estimation of the human state parameters 216 based on the application of the pHRI model 114 on the received human input parameters 210, the received context parameters 212, and the received robot parameters 214.

The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the system 102). In at least one embodiment, the memory 204 may store the parameters (e.g., the human input parameters 210, the context parameters 212, the robot parameters 214, the human state parameters 216, and the budget parameter 218). The human input parameters 210 may include the human background associated with the user 106A, or the set of human responses of the user 106A to the physical interaction of the HMI device 104 with the user 106A. In an embodiment, the set of human responses of the user 106A may include a speech input, a pitch of the speech input, a facial expression, a gaze, or a posture of the user 106A. The context parameters 212 may include the task context associated with the task, or the level of emergency associated with the task. The robot parameters 214 may include the set of robot attributes associated with the robot 112 or the robot behavior associated with the robot 112. The set of robot attributes may include at least one of a form factor, a level of autonomy, or degrees of freedom associated with the robot 112. The human state parameters 216 may correspond to at least one of the level of perceived safety, the level of perceived comfort, or the level of perceived trust of the physical interaction for the user 106A. The budget parameter 218 may include at least one of the time budget or the processing cost budget. The memory 204 may further store values of the human input parameters 210, the context parameters 212, the robot parameters 214, the human state parameters 216, the budget parameter 218, and the like. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input from the user 106A or the operator 106B. The reception of various parameters (the human input parameters 210, the context parameters 212, the robot parameters 214, and the like) may be indicative of operation parameters for the HMI device 104. In some embodiments, the I/O device 206 may receive the human input parameters 210, the context parameters 212, and the robot parameters 214. Examples of the I/O device 206 may include, but are not limited to, a touch screen, a keyboard, a mouse, a joystick, a microphone, a display device, and a speaker. Examples of the I/O device 206 may further include braille I/O devices, such as braille keyboards and braille readers.

The I/O device 206 may include a display device configured to render the electronic UI 118. The display device may include suitable logic, circuitry, and interfaces that may be configured to receive instructions from the circuitry 202 to render, on a display screen, parameters, for example, the human input parameters 210, the context parameters 212, the robot parameters 214, and the like. In at least one embodiment, the display device may be at least one of a resistive touch screen, a capacitive touch screen, or a thermal touch screen. The display device may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate communication between the system 102, the HMI device 104, and the server 108, via the communication network 120. The network interface 208 may be implemented by the use of various known technologies to support wired or wireless communication of the system 102 with the communication network 120. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

Figure 3:
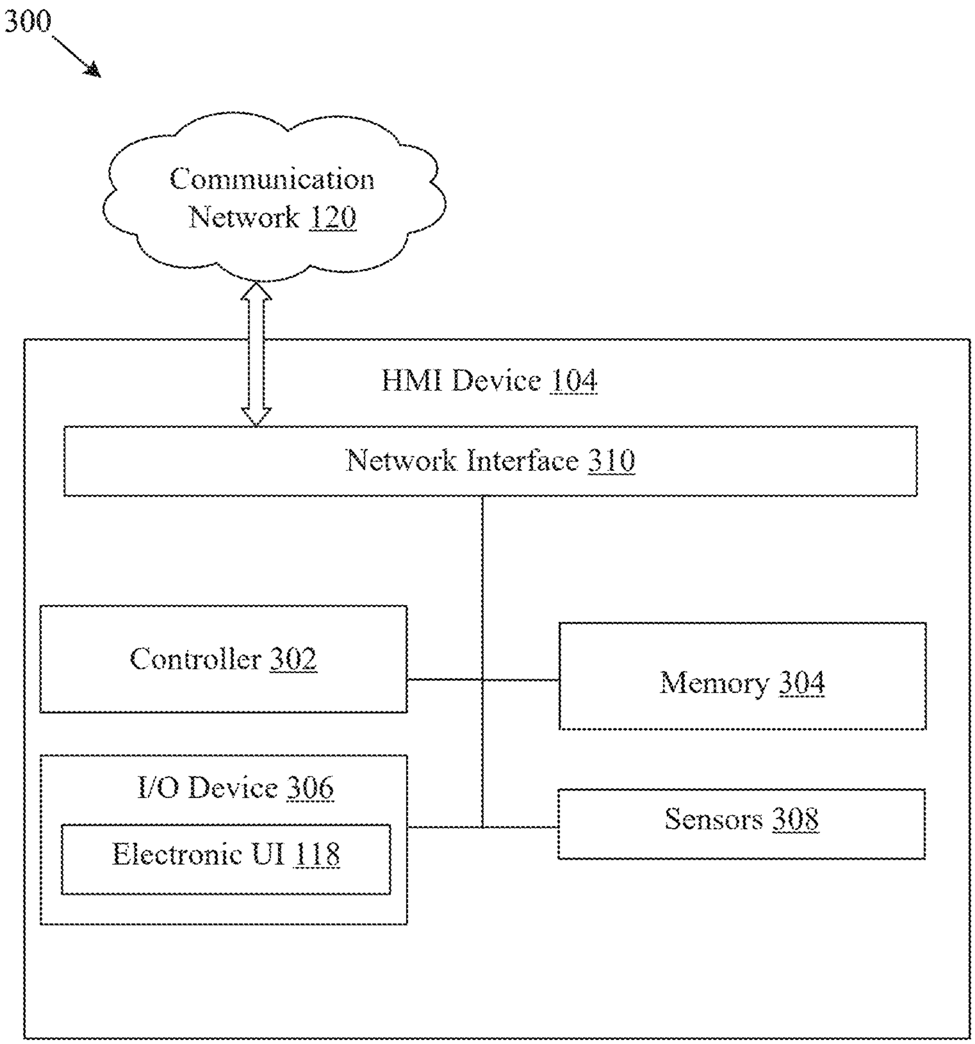
FIG. 3 is a block diagram that illustrates an exemplary HMI device of FIG. 1, for control of the HMI device based on the human state estimated from the pHRI, in accordance with an embodiment of the disclosure.

FIG. 3 is a block diagram that illustrates an exemplary HMI device of FIG. 1, for control of the HMI device based on the human state estimated from the pHRI, in accordance with an embodiment of the disclosure. FIG. 3 is explained in conjunction with elements from FIG. 1 and FIG. 2. With reference to FIG. 3, there is shown a block diagram 300 of the HMI device 104, which may include a controller 302, a memory 304, an input/output (I/O) device 306, sensors 308, and a network interface 310. In at least one embodiment, the I/O device 306 may also include the electronic UI 118. The controller 302 may be communicatively coupled to the memory 304, the I/O device 306, the sensors 308, and the network interface 310 through wired or wireless communication of the HMI device 104.

The controller 302 may include suitable logic, circuitry, and interfaces that may be configured to execute program instructions associated with different operations to be executed by the HMI device 104. The controller 302 may be a computer system that connects to the HMI device 104 in order to control the physical interaction of the HMI device 104 with the user 106A. In addition to physical interaction, the controller 302 may also be responsible for end-effector and prevent interference from occurring within the environment. The controller 302 may be coded with robotic programs and may include buttons, switches, or a touchscreen to allow for the input of programming commands.

The memory 304 may include suitable logic, circuitry, interfaces, and/or code that may be configured to store the program instructions to be executed by the controller 302. The program instructions stored on the memory 304 may enable the controller 302 to execute operations of the controller 302 (and/or the HMI device 104). In at least one embodiment, the memory 304 may store the parameters (e.g., the human input parameters 210, the context parameters 212, the robot parameters 214, the human state parameters 216, and the budget parameter 218). The memory 304 may further store values of the human input parameters 210, the context parameters 212, the robot parameters 214, the human state parameters 216, the budget parameter 218, and the like. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 306 may include suitable logic, circuitry, interfaces, and/or code that may be configured to receive an input and provide an output based on the received input. For example, the I/O device 306 may receive a user input from the user 106A or the operator 106B. The user input may be indicative of parameters (e.g., the human input parameters 210, the context parameters 212, the robot parameters 214, and the like) for the HMI device 104. In some embodiments, the I/O device 306 may receive input from the user 106A that may be indicative of the parameters based on the control of the rendering of the electronic UI 118. Examples of the I/O device 306 may include, but are not limited to, a touch screen, a keyboard, a mouse, a joystick, a microphone, the display device, and a speaker. Examples of the I/O device 306 may further include braille I/O devices, such as braille keyboards and braille readers.

The I/O device 306 may include a display device that includes the electronic UI 118. The display device may include suitable logic, circuitry, and interfaces that may be configured to receive instructions from the controller 302 to render, on a display screen, UI elements (e.g., a first UI element, a second UI element, and the likes), the information about the human background associated with the user 106A, or the set of human responses of the user 106A to the physical interaction of the HMI device 104 with the user 106A. In at least one embodiment, the display device may be at least one of a resistive touch screen, a capacitive touch screen, or a thermal touch screen. The display device may be realized through several known technologies such as, but not limited to, at least one of a Liquid Crystal Display (LCD) display, a Light Emitting Diode (LED) display, a plasma display, or an Organic LED (OLED) display technology, or other display devices.

The sensors 308 may include suitable logic, circuitry, interfaces, and/or code that may be configured to measure some attribute of their environment and convert it into a signal that can be read or interpreted by the HMI device 104. The sensors 308 may enable robots to understand and measure the geometric and physical properties of objects in their surrounding environment, such as position, orientation, velocity, acceleration, distance, size, force, moment, temperature, luminance, weight, etc. The sensors 308 may be essential for robots to operate with high precision and efficiency, and to interact safely and effectively with their environment and with other machines. The sensors 308 used in the HMI device 104 may include, but are not limited to, proprioceptive sensors, exteroceptive sensors, light sensors, and sound sensors.

In an example, proprioceptive sensors may measure values internal to the robot, such as joint angles, wheel speed, or battery voltage. For example, encoders may track the rotation of robot joints, enabling precise control of robotic arm movements during physical interactions with users. Exteroceptive sensors may acquire information from the robot's environment, such as distance measurements, light intensity, or sound amplitude. In the context of the HMI device 104, ultrasonic sensors may be used to detect obstacles and maintain safe distances from users during collaborative tasks. Light sensors in the HMI device 104 may include cameras and photodetectors. These sensors may enable visual perception capabilities, allowing the robot to recognize users, track their movements, and interpret visual cues. For instance, a depth camera may be used to create a 3D map of the interaction space, helping the robot navigate and position itself appropriately relative to the user. Sound sensors, such as microphones, may allow the HMI device 104 to detect and localize audio signals. This capability may be particularly useful for voice-activated interfaces or for detecting auditory cues from the environment that may influence the interaction context.

In some scenarios, the HMI device 104 may employ a combination of sensor types to enhance its perception capabilities. For example, during a physical therapy session, proprioceptive sensors in the robot's joints may work in conjunction with force sensors at the end-effector to precisely control the applied force and range of motion. Simultaneously, exteroceptive sensors like cameras and depth sensors may monitor the user's posture and movements, while sound sensors may detect verbal feedback or signs of discomfort.

The HMI device 104 may also incorporate advanced sensing technologies to further improve its interaction capabilities. Tactile sensors may be integrated into the robot's surface, allowing it to detect and respond to physical contact with users. These sensors may provide valuable feedback during touch-based interactions, enabling the robot to adjust its behavior based on the user's comfort level. Additionally, the HMI device 104 may utilize inertial measurement units (IMUs) to track its own motion and orientation, enhancing stability and precision during physical interactions. Sensor fusion techniques may be employed to combine data from multiple sensors, potentially improving the accuracy and reliability of measurements. For instance, visual odometry from cameras may be fused with inertial data from IMUs to achieve more robust position estimation. This approach may be particularly beneficial in dynamic environments where individual sensor readings may be subject to noise or occlusions.

The HMI device 104 may also leverage environmental sensors to adapt its behavior to changing conditions. Temperature and humidity sensors may allow the robot to adjust its operations in varying environmental conditions, ensuring consistent performance and user comfort. In industrial settings, gas sensors may be incorporated to detect the presence of harmful substances, enabling the HMI device 104 to alert users or take appropriate safety measures. To enhance the HMI device's ability to understand human states, biosensors may be integrated into the system. These may include non-invasive sensors capable of measuring physiological parameters such as heart rate, skin conductance, or even brain activity through electroencephalography (EEG). By monitoring these signals, the HMI device 104 may gain insights into the user's emotional and cognitive states, potentially allowing for more nuanced and responsive interactions.

In some implementations, the HMI device 104 may utilize wireless sensing technologies to extend its perception range beyond immediate physical contact. Radio frequency identification (RFID) sensors may enable the robot to identify and track tagged objects or individuals in its vicinity. This capability may be useful in scenarios where the robot needs to locate specific tools or materials, or to recognize authorized users in secure environments. The sensors 308 of the HMI device 104 may also incorporate self-diagnostic capabilities. By continuously monitoring sensor performance and detecting anomalies, the HMI device 104 may be able to identify potential sensor failures or calibration issues. This proactive approach may help maintain the reliability and safety of the human-robot interaction system over time. In advanced applications, the HMI device 104 may employ adaptive sensing strategies. The robot 112 may dynamically adjust its sensor usage based on the current task, environmental conditions, and user preferences. For example, in low-light conditions, the system may prioritize data from infrared cameras or tactile sensors over traditional visual sensors. This adaptability may allow the HMI device 104 to maintain optimal performance across a wide range of interaction scenarios.

The network interface 310 may include suitable logic, circuitry, and interfaces that may be configured to facilitate communication between the controller 302, the memory 304, and the I/O device 306, via the communication network 120. The network interface 310 may be implemented by using various known technologies to support wired or wireless communication of the HMI device 104 with the communication network 120. The network interface 310 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 310 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

Figure 4:
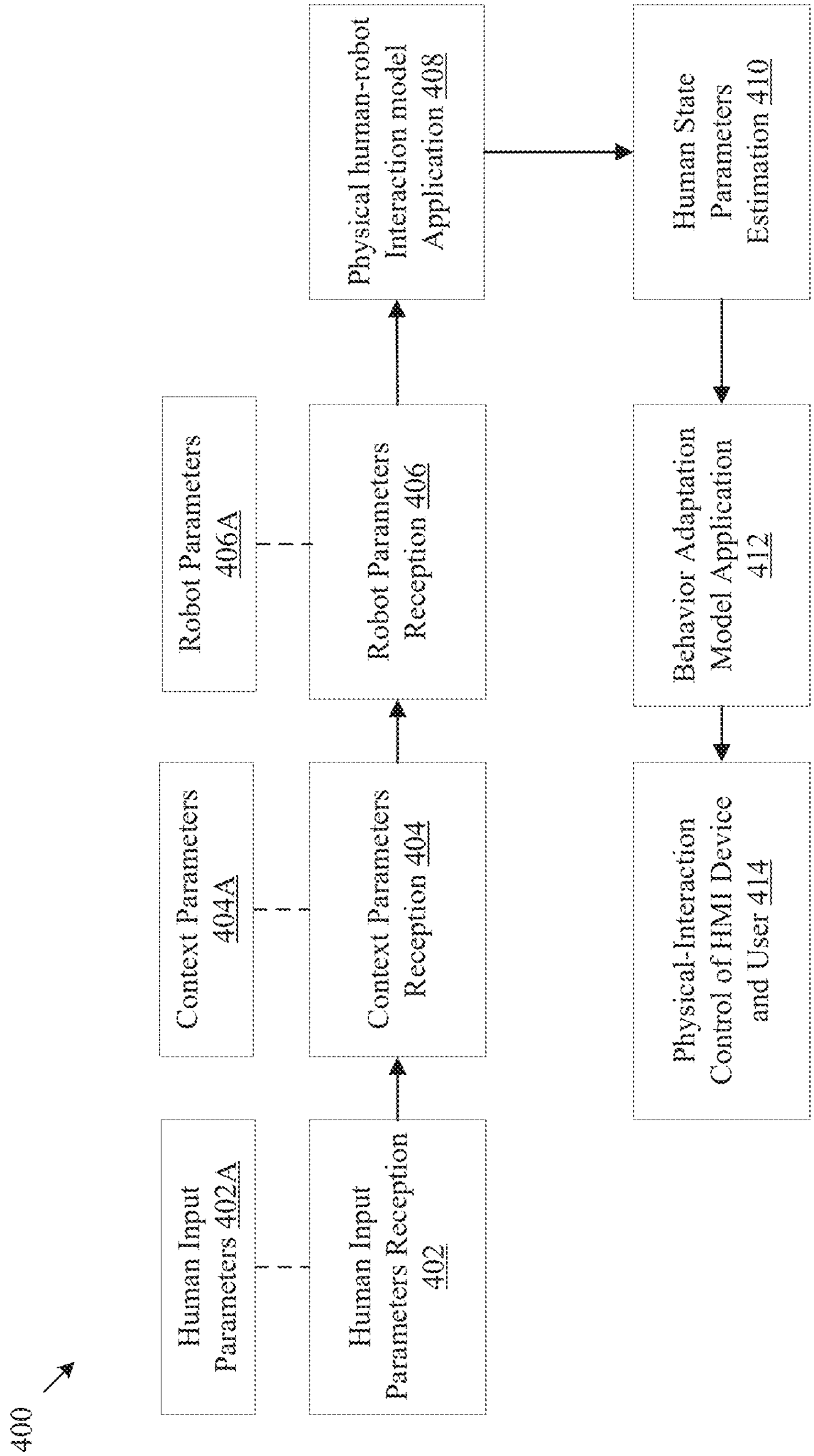
FIG. 4 is a diagram that illustrates a processing pipeline for control of the HMI device based on the human state estimated from the pHRI, in accordance with an embodiment of the disclosure.

FIG. 4 is a diagram that illustrates a processing pipeline for control of the HMI device based on the human state estimated from the pHRI, in accordance with an embodiment of the disclosure. FIG. 4 is explained in conjunction with elements from FIGS. 1-3. With reference to FIG. 4, there is shown an exemplary execution pipeline 400 for control of the HMI device 104 based on the human state estimated from the pHRI. The execution pipeline 400 may include operations 402 to 414 executed by a computing device, such as the system 102 of FIG. 1 or the circuitry 202 of FIG. 2.

At 402, an operation for reception of human input parameters may be executed. The circuitry 202 may be configured to receive human input parameters 402A associated with the physical interaction of the HMI device 104 with a user (e.g., the user 106A). In an embodiment, the circuitry 202 may receive the human input parameters 402A, from the user 106A or the operator 106B, via the electronic UI 118 (through the I/O device 206 and/or the I/O device 306). The human input parameters 402A may include at least one of a human background associated with the user 106A, or a set of human responses of the user to the physical interaction of the HMI device 104 with the user 106A. The human background associated with the user 106A may include at least one of an age of the user, a gender (categorized) of the user, an ethnicity (categorized) of the user, a robot familiarity (e.g., level of familiarity with or previous exposure to the robot 112) including at least one of a robotics background or an interaction duration of the user, or a physical condition of the user. The set of human responses may include verbal and physical responses of the human (e.g., the user 106A) when physically interacting with the robot 112. For example, the set of human responses may include a speech input (e.g., whether and what humans verbally utter during interaction) of the user, a pitch (e.g., the pitch of human's verbal utterance) of the speech input, a facial expression of the user, a gaze (e.g., a gaze direction of humans) of the user, or a posture (e.g., proximity of human to the robot 112) of the user.

The reception and measurement of the human input parameters 402A may be accomplished through various means, depending on the specific parameter being assessed. For instance, demographic information such as age, gender, and ethnicity may be collected through a user registration process or questionnaire integrated into the electronic UI 118. Robot familiarity may be gauged by presenting users with a series of images or descriptions of different robot types and asking them to rate their familiarity with each. Physical condition may be assessed through a combination of self-reporting and sensor-based measurements. For example, the HMI device 104 may use cameras with pose estimation algorithms to analyze the user's gait and range of motion, while also allowing users to input information about any physical limitations or medical conditions through the electronic UI 118.

Human responses during interaction may be captured using a variety of sensors and technologies. Speech input may be recorded using microphones integrated into the HMI device 104. Natural language processing techniques may be used to analyze the recorded speech input and determine a context of the user's utterances. Pitch analysis may be performed on the audio data to detect emotional cues or stress levels in the user's voice. Facial expressions may be monitored using computer vision techniques applied to video feeds from cameras mounted on the HMI device 104. These algorithms may detect and classify various emotional states based on facial muscle movements and micro-expressions. Gaze tracking may be accomplished using specialized eye-tracking cameras or by analyzing the orientation of the user's head and eyes in standard video feeds. Posture and proximity may be measured using a combination of depth sensors, LIDAR, or computer vision techniques to create a 3D map of the user's body position relative to the robot.

In practical scenarios, the collection of human input parameters may occur dynamically throughout the interaction. For instance, in a manufacturing setting, a new user approaching the HMI device 104 for the first time may be prompted to complete a brief onboarding process through the electronic UI 118, inputting their demographic information and experience level. As they begin to work alongside the robot, the sensors 308 may continuously monitor their posture, gaze, and facial expressions to detect signs of fatigue, confusion, or discomfort. If the user (e.g., the user 106A) verbally expresses frustration or asks for help, speech recognition systems may flag this input for immediate response or later analysis. Over time, the HMI device 104 may build a profile of the user's typical responses and behavior, allowing for more personalized and anticipatory interactions.

At 404, an operation for reception of robot parameters may be executed. The circuitry 202 may be configured to receive context parameters 404A associated with the task performed by the HMI device 104 based on the physical interaction of the HMI device 104 with a user (e.g., the user 106A). The context parameters 404A associated with the task performed by the HMI device 104 may include at least one of a task context associated with the task, or a level of emergency associated with the task. Additional parameters may include environmental factors (e.g., ambient temperature, lighting conditions, noise levels), user physiological data (e.g., heart rate variability, galvanic skin response, pupil dilation), or temporal factors (e.g., time of day, duration of interaction, frequency of task repetition).

For example, the task context may include at least one of an instrumental context associated with the task, or an affective context associated with the task. The instrumental context may relate to the specific actions being performed, such as assisting with a medical procedure, collaborating on an assembly line, or guiding a rehabilitation exercise. The affective context may encompass the user's emotional state during the task, such as anxiety during a complex operation, satisfaction upon successful task completion, or frustration when encountering difficulties. In an example, the level of emergency may include an extremity of situation the user 106A is in while performing of the task. This may range from routine operations to critical situations. For instance, a low emergency level may involve standard maintenance tasks or data collection activities. A moderate emergency level may include time-sensitive operations or responding to minor equipment malfunctions. A high emergency level may encompass scenarios such as assisting in a critical medical procedure, responding to a major system failure in an industrial setting, or intervening in potentially hazardous situations.

The context parameters 404A may be derived from various sources, such as force sensors detecting pressure and movement during physical interactions, cameras capturing facial expressions and body language, or microphones recording voice tone and volume. Techniques for determining the context parameters 404A may involve use of machine learning algorithms to analyze sensor data in real-time. For example, convolutional neural networks may process visual data from cameras to recognize user gestures and facial expressions, while recurrent neural networks may analyze temporal patterns in the sensor data to detect changes in task complexity or user fatigue. Natural language processing algorithms may be employed to interpret speech input and derive contextual information from user utterances. The HMI device 104 and/or the system 102 may also utilize sensor fusion techniques to combine data from multiple sources, enhancing the accuracy and robustness of context parameter estimation. For instance, data from IMUs, visual odometry, and force sensors may be integrated to create a comprehensive understanding of the physical interaction dynamics between the user and the HMI device 104. Adaptive thresholding algorithms may be implemented to dynamically adjust a sensitivity of detection of the context parameters 404A based on historical interaction data and user-specific profiles. This approach may allow the HMI device 104 and/or the system 102 to fine-tune an interpretation of context parameters 404A over time, accounting for individual differences in user behavior and task execution styles.

At 406, an operation for reception of robot parameters may be executed. The circuitry 202 may be configured to receive robot parameters 406A associated with the robot 112 coupled with the HMI device 104. The robot parameters 406A associated with the robot 112 coupled with the HMI device 104 may include at least one of a set of robot attributes associated with the context or a robot behavior associated with the robot 112. The robot parameters 406A may be crucial for establishing effective human-robot interaction and ensuring safe operation in various environments. Further, the robot parameters 406A parameters may provide a comprehensive description of the robot's capabilities and operational characteristics, enabling the HMI device 104 to adapt its interface and control strategies accordingly.

The set of robot attributes may include at least one of a form factor, a level of autonomy, or degrees of freedom (DOF) associated with the robot 112. Such parameters may define the flexibility and range of motion that the robot can achieve under human control. For example, the form factor could range from a compact robotic arm designed for precision tasks in confined spaces to a large, mobile industrial robot capable of handling heavy payloads. The level of autonomy might vary from fully teleoperated systems requiring constant human input to highly autonomous robots that can perform complex sequences of actions with minimal supervision. The degrees of freedom may significantly impact the robot's versatility and ability to perform various tasks. For instance, a 6-DOF robotic arm may be capable of reaching any point in its workspace with any desired orientation, while a 7-DOF arm may offer additional redundancy, allowing for more natural and human-like movements. These attributes may directly influence the robot's capability to perform tasks such as force/torque sensing, velocity and position control, admittance and impedance control, and the like.

The robot behavior may include at least one of a contact conformity of the robot 112, a force applied by the robot 112, a speed of the robot 112, a touch location of the robot 112 on a body part of the user 106A, a trajectory of motion of the robot 112, or a level of communication of the robot 112. These behavioral parameters may be dynamically adjusted based on the specific task requirements and user preferences. For example, contact conformity may refer to how well an end-effector of the robot 112 adapts to the shape of the object or body part it interacts with. In a medical scenario, a robot assisting with physical therapy may need to adjust its contact conformity to provide comfortable support for different body parts. The force applied by the robot 112 may be precisely controlled using advanced haptic feedback systems, allowing for delicate operations in scenarios such as robotic surgery or handling fragile objects in manufacturing processes.

The speed of the robot 112 may be modulated based on the task context and user comfort level. For instance, in a collaborative assembly task, the robot 112 may move quickly when working independently but slow down when in close proximity to the human operator (e.g., the operator 106B). The touch location parameter may be particularly important in scenarios involving physical human-robot interaction, such as in rehabilitation robotics or assistive care, where the robot needs to accurately and safely make contact with specific parts of the user's body. The trajectory of motion may be planned and executed using advanced algorithms that take into account obstacles in the environment, user safety, and task efficiency. For example, in a shared workspace, the robot 112 may use predictive path planning to avoid potential collisions with human workers while optimizing its motion for the given task. The level of communication of the robot 112 may encompass various modalities, including visual, auditory, and haptic feedback. For instance, a robot in a manufacturing environment may use LED indicators to signal its operational status, verbal cues to alert nearby workers of its intentions, and gentle vibrations to guide a user's hand during a collaborative task.

Based on a clarity of the robot behavior and decision-making processes, the HMI device 104 may allow humans to understand and predict the robot's next moves, leading to a sense of control and safety. This transparency may be achieved through various means, such as augmented reality overlays that visualize the robot's planned path, or real-time displays of the robot's internal state and decision-making processes. Predictable robots, which behave consistently and reliably, may enable humans to form accurate mental models of robot behavior, facilitating smoother collaboration. For example, in a warehouse setting, a mobile robot consistently following predefined paths and signaling its turns may allow human workers to anticipate its movements and work alongside it more comfortably. This predictability in robot actions may be essential, as it may reduce the fear of unexpected behaviors and foster an environment where humans feel safe to rely on robots, especially for critical tasks. In high-stakes environments such as emergency response scenarios, predictable robot behavior may be crucial for building trust between human operators and robotic systems.

To enhance predictability and control, advanced techniques such as shared control paradigms may be implemented. These may allow for dynamic allocation of control between the human operator (e.g., the operator 106B) and the robot (e.g., the robot 112) based on the task requirements and operator expertise. For instance, in a teleoperated surgical robot, the system 102 may provide more assistance and constrain the robot's movements when the operator is performing delicate procedures, while allowing more direct control during less critical phases of the operation. Furthermore, adaptive control algorithms may be employed to continuously refine the robot's behavior based on user feedback and interaction history. This may allow the robot to learn and adapt to individual user preferences over time, further enhancing the predictability and intuitiveness of the human-robot interaction.

At 408, an operation for the physical human-robot interaction (pHRI) model application may be executed. The circuitry 202 of the system 102 may be configured to apply the pHRI model 114 on the human input parameters 210, the context parameters 212, and the robot parameters 214. The pHRI model 114 may be designed to understand and interpret physical interactions between the user 106A and the robot 112 (and/or the HMI device 104). For example, the pHRI model 114 may integrate various sensors, data processing techniques, control strategies, and safety mechanisms to enable safe, effective, and intuitive interactions between the user 106A and the robot 112.

The pHRI model 114 may process a wide range of parameters from the human input parameters 210, which may include the user's position, velocity, applied forces, gestures, vocal commands, and physiological signals. For instance, the pHRI model 114 may analyze the user's hand trajectory and grip force when guiding a robotic arm or interpret changes in the user's heart rate and skin conductance as indicators of stress or fatigue during prolonged interactions. The context parameters 212 processed by the pHRI model 114 may encompass various environmental factors such as the presence and location of obstacles, lighting conditions, ambient noise levels, and temperature. The model may also consider task-specific contexts, such as the current phase of an assembly process or the criticality of a medical procedure being performed. The robot parameters 214 integrated into the pHRI model 114 may include the robot's current state (e.g., joint angles, end-effector position, and velocity), force output, power consumption, and operational mode (e.g., autonomous, collaborative, or teleoperated). The pHRI model 114 may also consider the robot's kinematic and dynamic properties, such as its workspace limitations and payload capacity.

The pHRI model 114 may integrate various sensors (e.g., the sensors 308) to gather comprehensive data about the interaction. These sensors may include force-torque sensors at joints or end-effector of the robot 112 to measure applied forces and torques, vision systems such as, color and depth sensor cameras (e.g., RGB-D cameras) or stereo camera pairs for tracking user movements and gestures, and tactile sensors on the robot's surface for detecting physical contact. In some implementations, wearable sensors on the user 106A, such as IMUs or EMG sensors, may provide additional input data to the model. Data processing techniques employed by the pHRI model 114 may include sensor fusion algorithms to combine data from multiple sources, reducing noise and uncertainty in measurements. Machine learning models, such as convolutional neural networks or support vector machines, may be used for real-time gesture recognition and intent prediction. The pHRI model 114 may also employ Kalman filters or particle filters for state estimation and trajectory prediction, enabling the system to anticipate user movements and adapt accordingly.

Control strategies implemented within the pHRI model 114 may include adaptive impedance control, allowing the robot to adjust its stiffness and damping characteristics based on the user's actions and the task requirements. Shared control schemes may be employed to dynamically allocate control authority between the user 106A and the robot 112, optimizing task performance while maintaining user engagement. The pHRI model 114 may also incorporate learning-based control approaches, such as reinforcement learning or iterative learning control, to improve interaction performance over time. Safety mechanisms integrated into the pHRI model 114 may include multi-level emergency stop functions triggered by excessive forces, unexpected movements, or user distress signals. The pHRI model 114 may implement dynamic safety zones that adjust based on the user's position and velocity, ensuring appropriate separation between the user and robot. Force limiting algorithms may be employed to restrict the maximum force applied by the robot 112, with thresholds that adapt to the specific task and user characteristics.

These components work together to enable safe, effective, and intuitive interactions between the user 106A and the robot 112. For instance, in a rehabilitation scenario, the pHRI model 114 may interpret a patient's movement intentions based on subtle muscle activations detected by EMG sensors, adjust the robot's assistance level accordingly, and guide the patient through therapy exercises while continuously monitoring for signs of fatigue or discomfort. In an industrial setting, the pHRI model 114 may facilitate collaborative lifting tasks by predicting the user's intended trajectory based on initial hand movements, dynamically adjusting the robot's contribution to the lifting force, and ensuring smooth coordination between human and robot actions. The pHRI model 114 may simultaneously monitor the workspace for potential collisions or hazards, adjusting the shared control strategy to prioritize safety when necessary.

The pHRI model 114 may also adapt its behavior based on the user's expertise level and familiarity with the robot 112. For novice users, the pHRI model 114 may implement more conservative control strategies with higher levels of guidance and error prevention. As users gain experience, the pHRI model 114 may gradually reduce assistance and allow for more direct control, enhancing the efficiency of the interaction while maintaining safety constraints. In scenarios involving dexterous manipulation tasks, the pHRI model 114 may utilize high-resolution tactile sensing to detect subtle changes in the user's grasp or applied forces. This information may be used to modulate the robot's fine motor control, enabling precise cooperative manipulation of delicate objects or intricate assembly of small components. The pHRI model 114 may incorporate real-time performance metrics and user feedback to continuously evaluate and optimize the interaction quality. These metrics may include task completion time, energy efficiency, smoothness of motion, and user comfort levels. By analyzing these factors, the pHRI model 114 may identify areas for improvement and adjust its parameters to enhance the overall interaction experience.

At 410, an operation for estimation of the human state parameters may be executed. The circuitry 202 may be configured to determine the human state parameters 216 based on the application of the pHRI model 114. The human state parameters 216 may correspond to at least one of a level of perceived safety, a level of perceived comfort, or a level of perceived trust of the physical interaction for the user 106A. These parameters may be crucial in ensuring a positive and effective human-robot interaction experience.

The circuitry 202 may determine the level of perceived safety, comfort, and trust using a multi-modal approach that integrates data from various sensors 308. For instance, the HMI device 104 may employ high-resolution cameras with advanced computer vision algorithms to analyze facial expressions, body language, and micro-expressions that may indicate the user's emotional state. Infrared sensors may be utilized to detect physiological responses such as changes in heart rate, skin temperature, or perspiration levels, which can provide insights into the user's stress or comfort levels during interaction. In scenarios involving physical contact, force sensors embedded in the robot's end-effectors or contact surfaces may measure the user's grip strength, tremors, or sudden movements that could indicate discomfort or uncertainty. For example, in a rehabilitation setting, the system 102 may control the sensors 308 to detect if a patient is tensing up or relaxing during assisted exercises, allowing the system 102 to adjust its support level accordingly. The system 102 may also incorporate audio analysis through microphones, using natural language processing and voice stress analysis to interpret verbal and non-verbal cues in the user's speech. This may be particularly useful in detecting frustration or confusion that might not be immediately apparent through visual cues alone.

In industrial applications, the system 102 may use proximity sensors and motion tracking to analyze the user's movement patterns and working posture. By detecting deviations from ergonomic positions or hesitations in movement, the system 102 may infer the user's comfort level with the robot's presence and adjust its behavior to enhance perceived safety. The circuitry 202 may receive and process this multi-modal sensor data, applying machine learning algorithms to synthesize the information and estimate the overall levels of perceived safety, comfort, and trust. These algorithms may be trained on large datasets of human-robot interactions, allowing them to recognize subtle patterns and correlations that might not be apparent to human observers. The HMI device 104 may be configured to operate based on a co-design experimental procedure with at least two iterations. This iterative approach may involve initial interaction sessions followed by detailed user feedback collection. The system may then adjust its parameters based on this feedback and conduct additional sessions to verify improvements. This process may continue until optimal levels of perceived safety, comfort, and trust are achieved.

The system 102 and/or the HMI device 104 may host a user interface (e.g., the electronic UI 118) to enable users to select and customize robot settings. The electronic UI 118 may utilize adaptive design principles, presenting options in an intuitive manner that evolves based on the user's experience level and preferences. For novice users, it may offer simplified controls with clear explanations, while advanced users may access more granular settings. Evaluation tools may be employed to measure the interaction experience using both quantitative and qualitative methods. Quantitative measures may include task completion times, error rates, and physiological data trends. Qualitative assessments may involve structured interviews, open-ended questionnaires, and observational studies conducted by human-robot interaction experts. The system 102 may employ natural language processing techniques to analyze user comments and feedback, extracting sentiment and specific concerns related to safety, trust, and comfort. This textual analysis may be combined with numerical ratings to provide a comprehensive evaluation of the user experience. In practical applications, the system 102 may be utilized in various scenarios. In healthcare, the system 102 could be used to optimize the behavior of assistive robots for elderly care, ensuring that patients feel safe and comfortable during daily interactions. In manufacturing, the system 102 may enhance collaborative robots' performance by continuously adapting to individual workers' preferences and skill levels, thereby improving productivity and job satisfaction.

The physical interaction of the HMI device 104 with the user 106A may be enhanced through reinforcement learning techniques. The system 102 may use the gathered experience data to train models that predict optimal robot behaviors for different user states and task contexts. These models may be continuously updated based on new interaction data, allowing the system 102 to adapt to changing user needs and environmental conditions over time. By integrating these advanced sensing, analysis, and adaptation techniques, the system 102 may create a responsive and empathetic interaction environment. This may lead to improved user acceptance of robotic systems in various fields, from healthcare and manufacturing to education and domestic assistance, by prioritizing the user's perceived safety, comfort, and trust throughout the interaction process.

At 412, an operation of behavior adaptation model application may be executed. The circuitry 202 may be configured to apply the behavior adaptation model 116 on the context parameters 404A, the human state parameters 216, and the budget parameter 218. The behavior adaptation model 116 may correspond to a dynamic programming model associated with a knapsack optimization technique, which enables efficient decision-making in resource-constrained scenarios. The context parameters 404A may include environmental factors such as ambient noise levels, lighting conditions, temperature, and spatial constraints of the workspace. Task-specific parameters may also be considered, such as the complexity of the current operation, time sensitivity, and potential hazards. For instance, in a manufacturing environment, the behavior adaptation model 116 may account for the presence of moving machinery or the handling of delicate components. Human state parameters 216 may encompass a range of factors including the user's emotional state, cognitive load, physical fatigue, and expertise level. These parameters may be derived from multimodal inputs such as facial expression analysis, voice stress detection, and physiological measurements. For example, if the user's heart rate variability indicates increased stress, the behavior adaptation model 116 may adjust the robot's behavior to be more predictable and less intrusive. The budget parameter 218 may represent various resource constraints, including, but not limited to, available processing power, energy consumption limits, time constraints, and actuator usage. The budget parameter may be dynamically updated based on the robot's current state and task requirements.

The behavior adaptation model 116 may utilize the knapsack optimization technique to select an optimal set of robot behaviors within the given constraints. Each potential behavior may be assigned a value based on its expected contribution to task performance and user experience, as well as a cost in terms of resource consumption. The behavior adaptation model 116 may then solve this optimization problem to maximize the overall value while staying within the budget constraints. For example, in a scenario where the robot 112 is assisting in a time-critical assembly task, the behavior adaptation model 116 may prioritize behaviors that increase speed and precision, potentially at the cost of higher energy consumption. Conversely, during a long-duration collaborative task, the behavior adaptation model 116 may select behaviors that optimize energy efficiency and user comfort over raw speed.

The behavior adaptation model 116 may be designed to enable the robot 112 to adjust its actions and responses based on the evolving interaction context. The modification of the behavior of the robot 112 may include a modification of at least one of, but not limited to, motion characteristics, a force application, communication modalities, and an autonomy level of the robot 112. For example, the modification of the motion characteristics may include an adjustment of speed, acceleration profiles, and trajectory smoothness of the robot 112 based on the user's comfort level and task requirements. The modification of the force application may include a variation of forces applied by the robot 112 on the user 106A during physical interactions with the user 106A to match the user's strength and the task's demands. Further, the modification of the communication modalities may include switching between verbal, visual, and haptic feedback methods based on environmental conditions and user preferences. Also, the modification of the autonomy level may include dynamic shifting between autonomous operation and user-guided control based on the complexity of the current subtask and the user's expertise.

The behavior adaptation model 116 may employ reinforcement learning techniques to continuously refine its behavior selection process. By observing the outcomes of its decisions, the robot 112 may improve its ability to choose appropriate behaviors in similar future scenarios. The control of the HMI device 104 may be further based on the selected robot behavior. This may involve adjusting a user interface (e.g., the electronic UI 118) to complement the robot's actions. For instance, if the robot 112 adopts a more cautious behavior due to detected user fatigue, the HMI device 104 may display more detailed status information and offer additional confirmation prompts before executing potentially risky actions.

In scenarios involving multiple robots or a robot with multiple end-effectors, the behavior adaptation model 116 may coordinate behaviors across the multiple robots or end-effectors to optimize overall performance. This may include load balancing between different robotic components or sequencing actions to minimize idle time and maximize efficiency. The behavior adaptation model 116 may also incorporate predictive elements, anticipating future states based on current trends in human state parameters and context. This proactive approach may allow the robot 112 to prepare for expected changes in advance, such as slowing down its movements in anticipation of a user approaching its workspace. By dynamically adapting robot behaviors based on this comprehensive analysis of context, human state, and resource constraints, the system 102 may achieve a more natural, efficient, and user-centric interaction experience across a wide range of applications and environments.

At 414, an operation for controlling the physical interaction of the HMI device 104 may be executed. The circuitry 202 may be configured to control a subsequent physical interaction of the HMI device 104 with the user 106A based on the application of the behavior adaptation model 116. This control may encompass various aspects of the physical interaction, including haptic feedback, force modulation, proximity management, and gesture-based communication. The behavior adaptation model 116 may influence these interactions by dynamically adjusting parameters such as force thresholds, movement speeds, and interaction distances. For instance, in a rehabilitation scenario, the HMI device 104 may adapt its assistive force during a joint mobility exercise based on the user's current range of motion and pain threshold, as determined by the behavior adaptation model 116.

The system 102 may employ advanced haptic rendering techniques to provide realistic tactile feedback during interactions. This may include using variable stiffness actuators to simulate different material properties or implementing texture rendering algorithms to convey surface characteristics through the HMI device 104. In a virtual training scenario for medical procedures, the system 102 may adjust the haptic feedback to accurately represent the feel of different tissues or the resistance of various surgical instruments. Further, gesture recognition capabilities may be integrated into the HMI device 104 that may enable the HMI device 104 to interpret and respond to user gestures. The behavior adaptation model 116 may refine the gesture recognition parameters based on the user's physical capabilities and preferences. For example, in an industrial setting, the system 102 may recognize simplified gestures for users with limited mobility, ensuring inclusive interaction.

The system 102 may implement adaptive impedance control algorithms to modulate a behavioral compliance of the HMI device 104 during physical interactions. This may allow the HMI device 104 to seamlessly transition between rigid and compliant behaviors based on task requirements and a user state. In a collaborative assembly task, the HMI device 104 may increase its stiffness when precise positioning is required and become more compliant when guiding the user through a new motion sequence.

Proximity sensors and computer vision techniques may be utilized to manage the spatial relationship between the HMI device 104 and the user 106A. The behavior adaptation model 116 may adjust proximity thresholds based on the user's comfort level and task context. In a crowded manufacturing environment, the system 102 may maintain larger safety margins around novice users while allowing closer interactions with experienced operators.

The system 102 may incorporate predictive models to anticipate user intentions and prepare for upcoming interactions. By analyzing patterns in the user's movements and physiological signals, the HMI device 104 may proactively adjust its position or prepare relevant tools before the user initiates a specific action. This predictive capability may enhance the fluidity and naturalness of the physical interaction. In scenarios involving delicate or precise manipulations, the system 102 may implement tremor compensation techniques. The behavior adaptation model 116 may analyze the user's hand stability and apply appropriate filtering algorithms to smooth out unintended movements. This may be particularly beneficial in applications such as microsurgery or electronic component assembly.

The physical interaction control may also extend to the modulation of an appearance and behavior of the HMI device 104 to enhance user comfort and trust. For instance, in a healthcare setting, the system 102 may adjust movement patterns of the HMI device 104 to appear more gentle and non-threatening when interacting with anxious patients, based on an assessment of the behavior adaptation model 116 of the user's emotional state. By integrating these advanced control strategies and adapting them in real-time based on the behavior adaptation model 116, the system 102 may achieve highly nuanced and context-appropriate physical interactions between the HMI device 104 and the user 106A across a wide range of applications and environments.

Figure 5A:
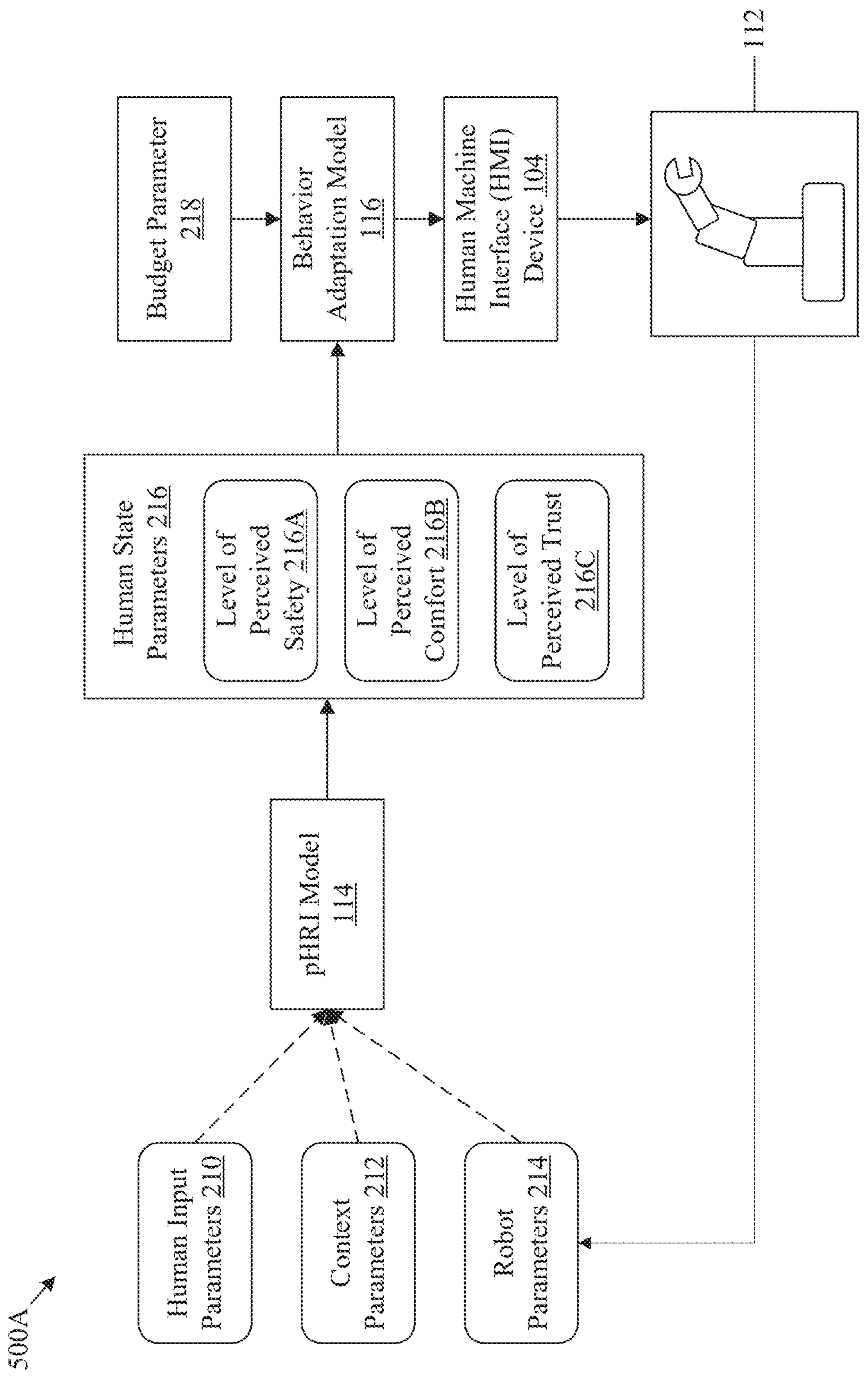
FIG. 5A is a flowchart that illustrates an exemplary scenario for control of the HMI device based on the human state estimated from the pHRI, in accordance with an embodiment of the disclosure.

FIG. 5A is a diagram that illustrates an exemplary scenario for control of the HMI device based on the human state estimated from the pHRI, in accordance with an embodiment of the disclosure. FIG. 5A is explained in conjunction with elements from FIGS. 1-4. With reference to FIG. 5A, there is shown an exemplary scenario 500A of HMI device control. The scenario 500A may include the HMI device 104, the robot 112, the pHRI model 114, the behavior adaptation model 116, and various parameters, which may affect control of the HMI device 104 based on the human state. The various parameters may include, for example, the human input parameters 210, the context parameters 212, the robot parameters 214, and the budget parameter 218. It should be noted that the scenario 500A of FIG. 5A is for exemplary purposes and should not be construed to limit the scope of the disclosure.

In an embodiment, the human input parameters 210 may not be changed during the physical interaction of the HMI device 104 with the user 106A. For example, the human input parameters 210 may include an age of the user, a gender of the user, an ethnicity of the user, a robot familiarity, or a physical condition of the user that may be inherent and remain unchanged during the physical interaction of the HMI device 104 with the user 106A. In an embodiment, the robot parameters 214 may include the set of robot attributes and the robot behavior associated with the robot 112. In one aspect, the set of robot attributes may not be changed during the physical interaction of the HMI device 104 with the user 106A. For example, the set of robot attributes may comprise a size, a level of mobility, an appearance, a shape, or a skin type of the robot 112 as the inherent robot parameters. In another aspect, the robot behavior may be dynamic parameters that may be changed during the physical interaction of the HMI device 104 with the user 106A. For example, the robot behavior may include at least one of a contact conformity of the robot 112, a force applied by the robot 112, a speed of the robot 112, a touch location of the robot 112 on a body part of the user 106A, a trajectory of motion of the robot 112, or a level of communication of the robot 112. The robot behavior may include the communication mode of the robot as verbal communication modality or nonverbal communication modality. The robot behavior may further include nature of the task context as the affectionate context or the instrumental context. The robot behavior may include motion delay of the robot 112 and the number of robot waypoints, close proximity of the human (e.g., the user 106A) to the robot 112, and the interaction location of the robot 112 on human's body.

The pHRI model 114 may be applied on the human input parameters 210, the context parameters 212, and the robot parameters 214 to estimate the human state parameters 216. The human state parameters 216 may include at least one of the level of perceived safety, the level of perceived comfort, or the level of perceived trust of the physical interaction for the user 106A. In an embodiment, the human perception may be investigated under different settings (e.g., robot giving bed bath, assisted feeding) and robotic platforms (e.g., robot arm, mobile robot) for the robot 112 with respect to the perceived safety, comfort, trust, and intention, especially, when the HMI device 104 physically interacts with the user 106A.

For example, an experiment may be conducted with a set of participants about user perception of robot-initiated touch interactions based on varied robot parameters (e.g., speed, timing, smoothness of motion, number of contact points, force applied by the robot at contact, and contact material) and through two tasks (such as wiping arm to represent a medical scenario of sterilizing the area and grooming hair to represent a scenario of assistance with daily activities). The participants may then choose their desired level for the selected robot parameters, to evaluate the physical interaction in terms of the perceived safety, comfort, and trust. The selected robot parameters may be then changed by the participants in the consecutive iteration of a particular task, and report new evaluations. In an example, related survey questions that may be asked from the users may be based on 11-point scale ranging from 0 to 10. The collected dataset through this study may contain human background, human responses, robot behaviors, context and the associated human state ratings to be used by the pHRI model 114.

Further, data associated with the human states may be obtained in which the participants provide ratings (e.g., in a range of 0-10) for the performance of the robot 112 in terms of perceived safety, comfort, and trust. This data associated with the human states (i.e., the ratings) may be used to train and evaluate the behavior adaptation model 116. Different methods for regression, such as, but not limited to, Random Search, Random Forest, Gaussian Process Regression, and Support Vector Machine, may be used to fine tune the behavior adaptation model 116. Among these, the Random Forest method may be used to predict the continuous values of the human states on the evaluation set due to its better performance over the other two. The evaluation of the human states may be performed based on Random Forest method on metrics like Mean Absolute Error (MAE) and Mean Squared Error (MSE).

In one scenario, the set of participants included 14 male members and 6 female members with a 23-58 age range from different ethnicities, various levels of familiarity having experience working with robots (e.g., from no exposure to robots to being a robotics researcher with daily exposures to running robots), and different levels of physical conditions. For example, in an experimental setting, safety ratings and comfort ratings have values from 4 to 10, and trust ratings have values from 3 to 10. A set of experimental evaluation results of the human states based on the Random Forest method is shown in Table 1.

TABLE 1

Evaluation of human states in terms of perceived safety, comfort, and trust

| Metric | Perceived Safety | Perceived Comfort | Perceived Trust |
|---|---|---|---|
| MAE | 0.758 | 0.668 | 0.688 |
| MSE | 0.997 | 0.733 | 0.704 |

With reference to Table 1, it may be observed that the prediction errors are low for perceived states of safety, comfort, and trust. Moreover, the MAE values of state estimation are significantly lower than their data respective standard deviation. The values in Table-1 are for exemplary purposes and should not be construed to limit the scope of the disclosure.

SHAP (SHapley Additive explanations) values is a game theory-based approach for explaining machine learning model outputs by assigning importance values to each feature. In machine learning, SHAP values provide a consistent and objective method for interpreting how individual features impact model predictions, showing both the direction (positive or negative) and magnitude of their effects. Key benefits of SHAP values include their ability to explain individual predictions, compare feature importance, and reveal feature interactions. SHAP values are model-agnostic, making them applicable to a wide range of machine learning models, including linear regression, decision trees, random forests, gradient boosting models, and neural networks.

In an embodiment, SHAP feature importance analysis may be used to quantitatively determine which features contribute the most to the human state estimation, based on feature's mean absolute SHAP values on all data points averaging across perceived states of safety, comfort, and trust. The SHAP values of the top ten most important features are shown in Table-2.

TABLE 2

SHAP values of top ten most important features

| Rank | Feature | Mean Absolute SHAP Value |
|---|---|---|
| 1 | Physical Condition | 0.1716 |
| 2 | Interaction Duration | 0.1300 |
| 3 | Age | 0.1235 |
| 4 | Body Part | 0.0995 |
| 5 | Delay | 0.0953 |
| 6 | Posture | 0.0933 |
| 7 | Contact Conformity | 0.0761 |
| 8 | Speed | 0.0280 |
| 9 | Material | 0.0199 |
| 10 | Facial Expression | 0.0186 |

For example, with reference to Table-2, it may be observed that physical condition may be the most important feature, indicating that people with different physical limitations could have different perceptions of robots during interaction. It may also be observed that interaction duration may be an important feature, in which human state values change depending on how long humans interact with robots. This observation may be consistent and valid as human perception, such as trust, is a function over interaction time and may potentially increase the more humans interact with robots. Body part (e.g., the touch location) and posture (e.g., the proximity to robot) may also influence human perception, as different touch location and robot's distance to human results in different human perception toward robots. Moreover, contact conformity (e.g., how the robot conforms its hand with a human's body part) may have a high influence on the human perception. In an example, robot task related parameters (e.g., the robot parameters including contact conformity, body part, posture, delay, and speed, or the like) may be used to design robotic touch behaviors. The values in Table-2 are for exemplary purposes and should not be construed to limit the scope of the disclosure.

The behavior adaptation model 116 may be applied on the context parameters 212, the human state parameters 216, and the budget parameter 218, to control a subsequent physical interaction of the HMI device 104 with the user 106A. The behavior adaptation model 116 may correspond to a dynamic programming model associated with a constrained knapsack optimization technique. For example, a human's preference of a particular robot behavior may be captured by human's perceived safety, comfort, and intuitiveness ratings of the behaviors, and the costs represented by time consumption and interruption of the behaviors to humans. In order to improve a human's perception of the interaction, the system 102 may generate information about a set of behaviors that maximizes a total sum of benefits and costs, if the set of behaviors is performed within a certain time. This representation may be modeled as a constrained Knapsack problem formulation. In an embodiment, the robot 112 may perform "N" behavior related tasks in total, where each behavior, denoted by "i", has some cost "$c_i$" and benefit "$b_i$" associated with it and takes time "$t_i$" to be performed. For such behaviors, there may exist a maximum cost "T" as the total time budget for the entire behaviors to be performed (does not include human's response time during the sequence of robot's behaviors). Additionally, there may be mutual exclusivity "M" between pairs of behaviors which prevent simultaneous execution of those behaviors (i.e., a robot's behavior of gazing at a User and another behavior of gazing at a touch location). The mutual exclusivity may be represented by an equation given below.

$$M = [m_{i,j}] \quad (1)$$

In the above equation (1), the mutual exclusivity (M) is an N×N symmetric, binary matrix with zero diagonal, where $m_{i,j}$ is equal to "1", if "i" and "j" are mutually exclusive and $m_{i,j}$ is equal to zero in case of non-mutual exclusivity between "i" and "j". An optimization using a knapsack optimizer may determine the behaviors to be performed by the robot 112 (e.g., behavior i will be performed if $x_i$=1 and not if $x_i$=0) such that the weighted sum of the benefits and costs associated with the behaviors is maximum, while the total execution time of all the selected behaviors stays below the maximum cost (T). This may be represented by an equation given below.

$$\max_{xi \in X} \sum_{i=1}^{N} (\alpha bi - \beta ci)xi \quad (2)$$

$$\text{s.t.} \sum_{i=1}^{N} tixi < T \quad (3)$$

As shown in the above equations (2) and (3), the benefit ($b_i$) of each behavior may be represented with ratings of safety (i.e., a level of perceived safety 216A), comfort (i.e., a level of perceived comfort 216B), and intuitiveness of the behavior (i.e., a level of perceived trust 216C) as perceived by the users. The cost ($c_i$) of each behavior may be ratings of the level of time-consumption and interruption of the behavior as perceived by the users. The coefficients (α) and (β) may be a relative scale between the benefit and cost (0≤α, β≤1). A benefit and cost predictor may be used to determine the benefits and costs of all the behaviors based on human background, context (task and level of emergency of the situation), and the current human state determined from the pHRI model 114.

In an embodiment, the behavior adaptation model 116 may be configured to select a robot behavior based on the human state parameters 216 and the budget parameter 218. The subsequent control of the HMI device 104 may be further based on the selected robot behavior. For example, various robot communication behaviors may be evaluated by the list of participants or participant (e.g., the user 106A), during different timings such as before touch, during touch, and before first contact. An evaluation of the robot communication behaviors may be determined based on ratings indicating how the participants would perceive each behavior in terms of being time-consuming and interruptive, and whether that behavior contributes to their feeling of safety, comfort, and intuitiveness in the interaction with the robot. A questionnaire may be designed using a robotic social attributes scale (RoSAS). In an example, a questionnaire may include questions to be rated on 7-point scale ranging from 1 (strongly disagree) to 7 (strongly agree). The behavior benefit and cost prediction model (e.g., the behavior adaptation model 116) may predict the benefits (average value of perceived safety, comfort, and trust) and costs (average value of time-consumption and interruption) associated with each behavior, given the information on human's current state, human background (preference), and context (task and level of emergency). The human's state values may be estimated from data of the pHRI model 114. Using the robot, human, and context data, the behavior adaptation model 116 may predict the participant states (perceived safety, comfort, and trust) all with range from 0 to 10. Further, in an example, the task context may be one-hot encoded (in this case, instrumental may be "1" and affective is "0") and the level of emergency may be encoded as "1" (not an emergency situation).

The prediction outputs may be real values from 1 to 7 for the average values of benefit and cost, for each participant and each behavior of the robot 112. Deep-learning and tree-based methods may be used to train the behavior adaptation model 116. In an example, certain methods like ResNet, Tab Transformer, TabNet, Random Forest, XGBoost, and LightGBM may be evaluated. A comparison between results obtained using various methods is presented in Table-3. The table includes averages of Mean Absolute Error and Mean Squared Error of behaviors' benefits and costs for each of these methods.

TABLE 3

MAE and MSE results for benefit and cost prediction

| Type | Method | Benefit MAE | Benefit MSE | Cost MAE | Cost MSE |
|---|---|---|---|---|---|
| Deep | ResNet152 | 0.795 | 1.078 | 1.182 | 2.143 |
| Learning | Tab Transformer | 0.817 | 1.062 | 0.969 | 1.394 |
| | TabNet | 0.898 | 1.406 | 1.019 | 1.545 |
| Tree- | Random Forest | 0.7803 | 1.0052 | 0.964 | 1.340 |
| based | XGBoost | 0.7435 | 0.959 | 0.945 | 1.468 |
| | LightGBM | 0.780 | 1.005 | 0.979 | 1.370 |

For example, with reference to Table-3, results may indicate that the tree-based methods may outperform the deep learning-based methods for subjective tabular human data. In current example, XGBoost may perform better than the other models based on the MAE and MSE values of benefit prediction, as well as the MAE value of cost prediction, while Random Forest performed better than the other models based on the MSE cost prediction. The values in Table-3 are for exemplary purposes and should not be construed to limit the scope of the disclosure.

The robot parameters 214, for example, the set of robot attributes or the robot behavior associated with the robot 112, may be definite parameters that may remain unchanged. The parameters, such as the size, the level of mobility, the appearance, the shape, or the skin type of the robot 112, may be the inherent parameters of the robot 112. The parameters, such as the contact conformity of the robot 112, the force applied by the robot 112, the speed of the robot 112, the touch location of the robot 112 on the body part of the user 106A, the trajectory of motion of the robot 112, or the level of communication of the robot 112, may be robot behavior parameters that may change during a physical interaction of the HMI device 104 with the user 106A.

For example, the robot behavior may be verbal or non-verbal behavior. Each of the robot behaviors (e.g., verbal and non-verbal) may have a description associated with robot state. For this, a user study may be conducted to collect data from multiple users. The data may include preferences of each user with respect to verbal behavior and non-verbal behavior of the robot 112, while the robot 112 interacts with each user. The behavior adaptation model 116 may be applied to the human state parameters (e.g., the data of multiple users) to estimate the human state associated with each user. The description associated with each of the robot behaviors may be recorded based on the human state (e.g., the human state parameters 216) of each user. The description associated with each behavior, in an experimental setup may be shown by Table-4. The behaviors and descriptions in Table-4 are for exemplary purposes and should not be construed to limit the scope of the disclosure.

TABLE 4

Robot Behaviors and Descriptions

| Group | Behavior | Description |
|---|---|---|
| Verbal | Greetings | The robot verbally greets users |
| | Prescreen | Robot asks user some background questions |
| | Permission | Robot asks user for permission before touching |
| | Intention Description | Robot describes the intention of the touch to user before touching |
| | Notification | Robot notifies user before ending the touch |
| | Feedback | Robot asks user for feedback on the touch |

TABLE 4-continued

Robot Behaviors and Descriptions

| Group | Behavior | Description |
|---|---|---|
| Non-Verbal | Eye Gaze | Robot looks at user or looks at touch location |
| | Facial Expression | Robot shows facial expression, either static or dynamic, during the touch |
| | Hand Showing | Robot shows its hands to user |
| | Short Pause | Robot pauses shortly right before the contact to obtain unsaid permission |
| | Light Tap | Robot taps lightly on user to signal intention |

Figure 5B:
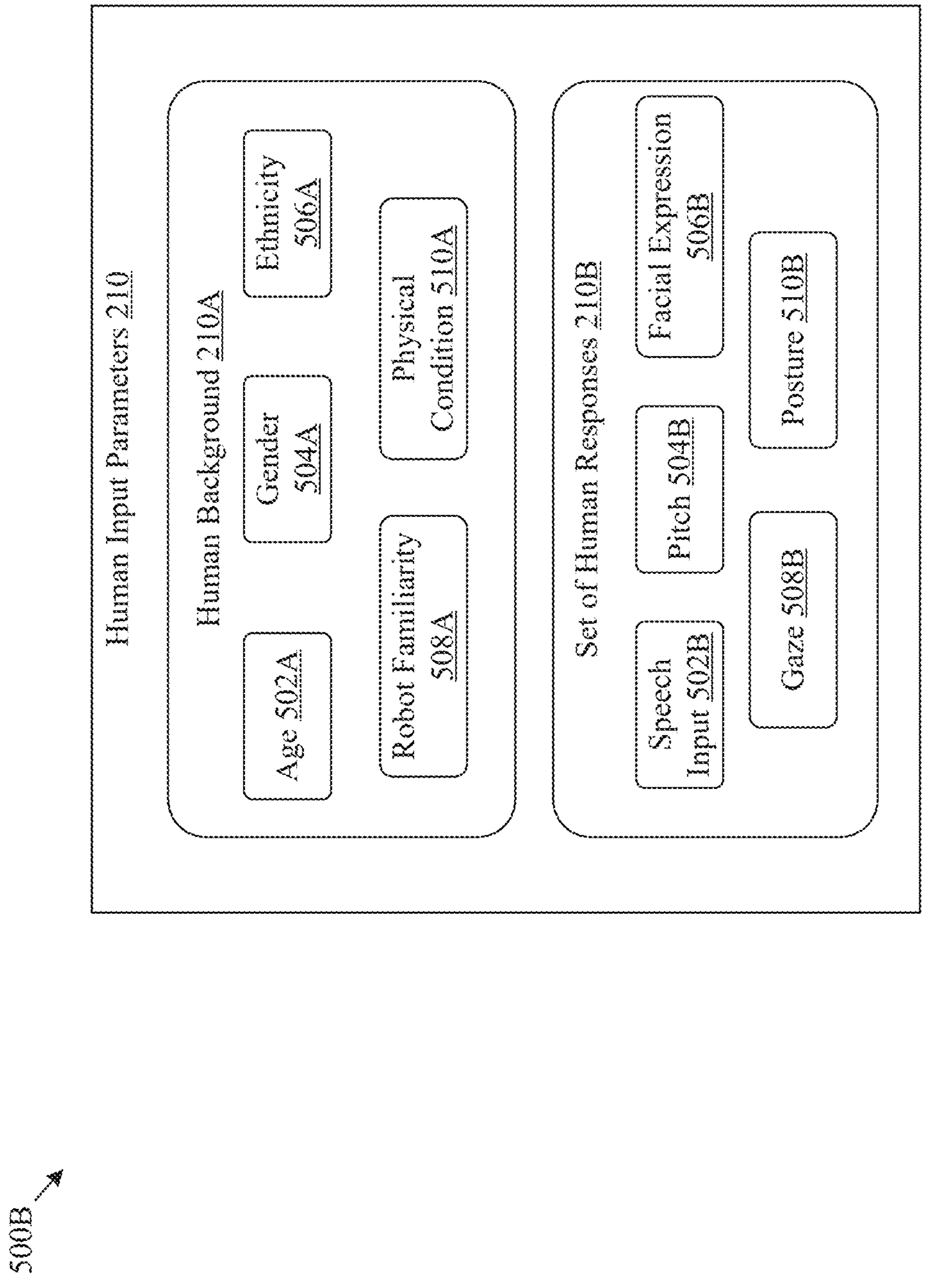
FIG. 5B is a diagram that illustrates an exemplary scenario of human input parameters associated with the pHRI, in accordance with an embodiment of the disclosure.

FIG. 5B is a diagram that illustrates an exemplary scenario of human input parameters associated with the pHRI, in accordance with an embodiment of the disclosure. FIG. 5B is explained in conjunction with elements from FIGS. 1-4 and 5A. With reference to FIG. 5B, there is shown an exemplary scenario 500B of the human input parameters 210 that includes the categorization of the human input parameters 210 into various parameters. The various parameter may include, for example, human background 210A and a set of human responses 210B. It should be noted that the scenario 500B of FIG. 5B is for exemplary purposes and should not be construed to limit the scope of the disclosure.

The circuitry 202 may receive the human background 210A of the user 106A and the set of human responses 210B of the user 106A associated with the physical interaction of the HMI device 104 with the user 106A. In an embodiment, the human background 210A may be inherent human parameters that may not be changed during the course of the physical interaction. In some aspects, the human background 210A may include at least one of an age 502A, a gender 504A, an ethnicity 506A, a robot familiarity 508A, or a physical condition 510A of the user 106A. The robot familiarity 508A may include at least one of a robotics background or an interaction duration of the user 106A. For example, the human background 210A may be obtained from a pre-experiment survey in which the age 502A is real number, the gender 504A and ethnicity 506A are one-hot encoded, the robotics background is binary, the interaction duration is the trial number (1 and 2), and the physical condition 510A is an integer from 1 to 5.

In an embodiment, the set of human responses 210B of the user 106A may be received during the physical interaction of the user 106A with the robot 112, and the set of human responses 210B may change through the course of the physical interaction. In some aspects, the set of human responses 210B may include a speech input 502B (e.g., whether or what humans verbally utter sentences), a pitch 504B (e.g. the pitch of human's verbal utterance) of the speech input 502B, a facial expression 506B, a gaze 508B (e.g., the gaze location), or a posture 510B of the user 106A. For example, the set of human responses 210B may be obtained from interaction videos, in which semantic and pitch are binary values depending on whether participant talks and has pitch change, facial expression is binary depending on whether participant shows any recognizable facial expression (e.g., happy, sad, or any other emotion), gaze is binary depending on whether or not the robot 112 looks at the robot end effector, posture is integer from 1 to 3 depending on how far participant stands from the robot 112.

Figure 5C:
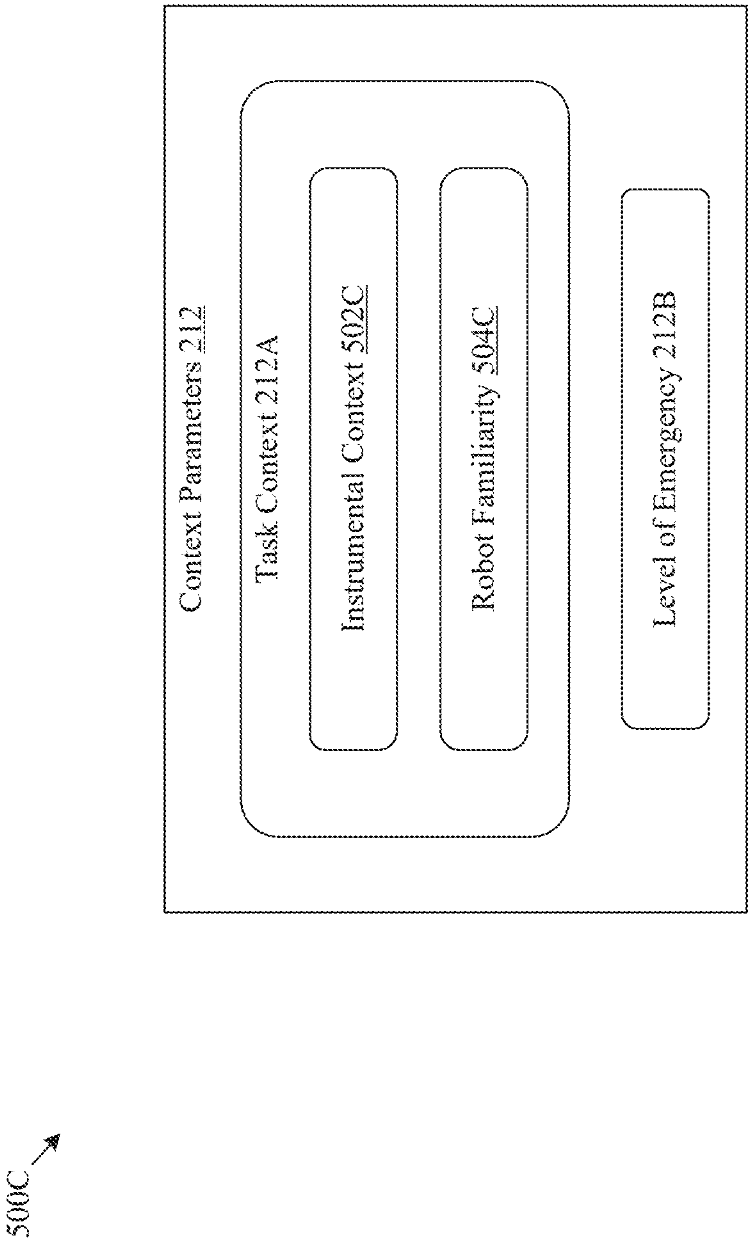
FIG. 5C is a diagram that illustrates an exemplary scenario of context parameters associated with the pHRI, in accordance with an embodiment of the disclosure.

FIG. 5C is a diagram that illustrates an exemplary scenario of context parameters associated with the pHRI, in accordance with an embodiment of the disclosure. FIG. 5C is explained in conjunction with elements from FIGS. 1-4 and 5A-5B. With reference to FIG. 5C, there is shown an exemplary scenario 500C of the context parameters 212 that includes the categorization of the context parameters 212 into various parameters. The various parameters may include, for example, a task context 212A and a level of emergency 212B. It should be noted that the scenario 500C of FIG. 5C is for exemplary purposes and should not be construed to limit the scope of the disclosure In an embodiment, the context parameters 212 may be task parameters associated with the task to be performed by the robot 112. For example, the context parameters 212 may be obtained from the task descriptions. In some aspects, the task context 212A may include at least one of an instrumental context 502C or an affective context 504C associated with a task. In an embodiment, the context parameters 212 may also include the level of emergency 212B associated with the task. In an example, the task context 212A may be one-hot encoded between instrumental and affective, and the level of emergency 212B (discretized into 5 levels from 1 to 5) may be "1" (no emergency) due to participants being in the same touch situation.

Figure 5D:
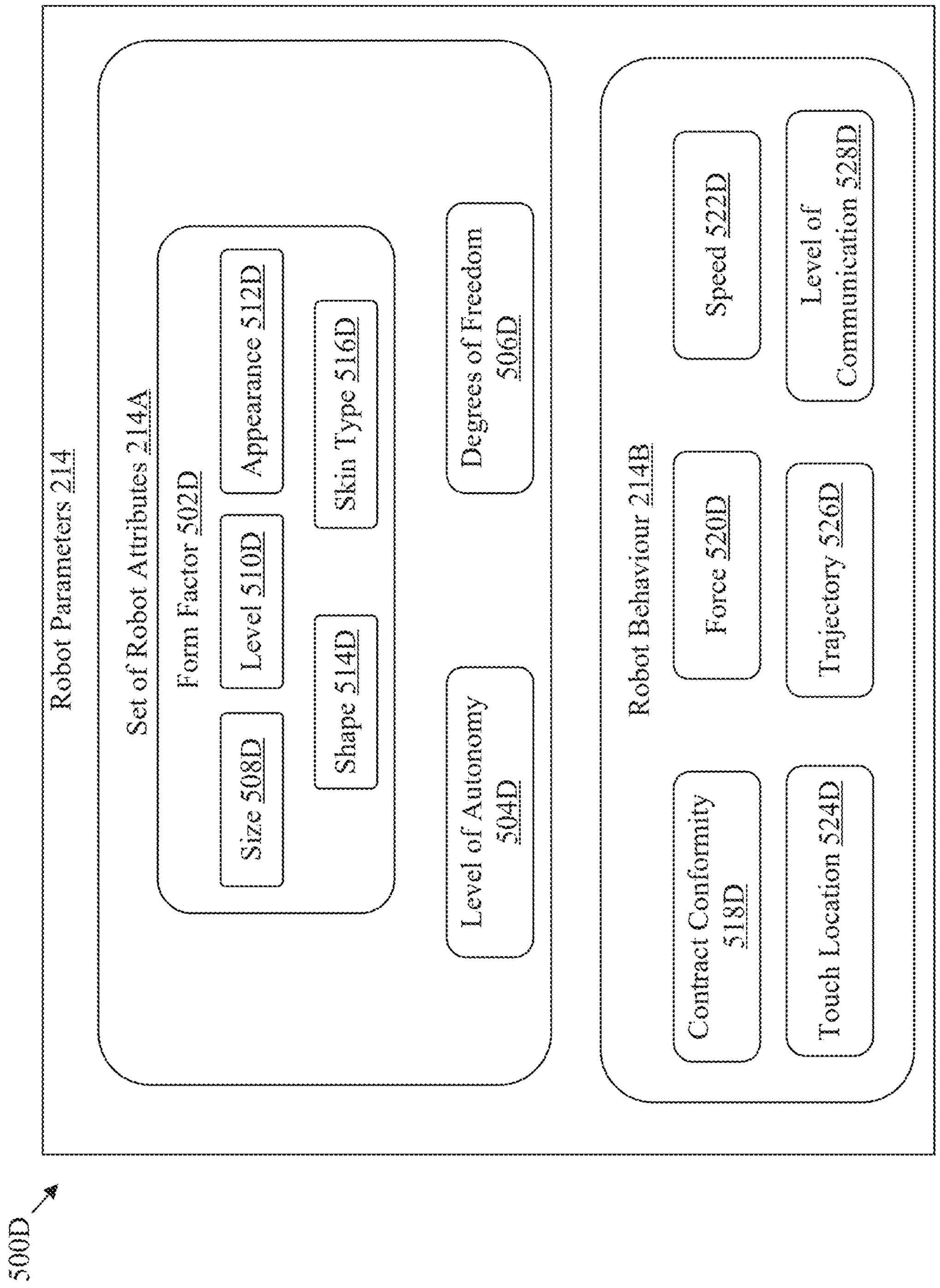
FIG. 5D is a diagram that illustrates an exemplary scenario of robot parameters associated with the pHRI, in accordance with an embodiment of the disclosure.

FIG. 5D is a diagram that illustrates an exemplary scenario of robot parameters associated with the pHRI, in accordance with an embodiment of the disclosure. FIG. 5D is explained in conjunction with elements from FIGS. 1-4 and 5A-5C. With reference to FIG. 5D, there is shown an exemplary scenario 500D of the robot parameters 214 that includes the categorization of the robot parameters 214 into various parameters. The various parameters may include, for example, a set of robot attributes 214A or a robot behavior 214B associated with the robot 112. It should be noted that the scenario 500D of FIG. 5D is for exemplary purposes and should not be construed to limit the scope of the disclosure.

In an embodiment, the set of robot attributes 214A may be inherent robot parameters that may not be changed during the course of the physical interaction. For example, the set of robot attributes 214A may include at least one of a form factor 502D, a level of autonomy 504D, or degrees of freedom 506D associated with the robot 112. In one aspect, the form factor 502D associated with the robot 112 may include at least one of a size 508D (e.g., physical size of the robot 112), a level 510D (e.g., robot's possessed mode of mobility like legs, wheels, or none), an appearance 512D (e.g., physical appearance, such as anthropomorphic, zoomorphic, mechanoid, or the like), a shape 514D (e.g., whether the robot has a round or sharp outer shape), or a skin type 516D (e.g. the color and the material of the robot outer skin) of the robot 112. In another aspect, the level of autonomy 504D may be adapted to four levels from ten levels of robot autonomy. For example, the level of autonomy 504D may include a no autonomy (e.g., human-operated), a low autonomy (e.g., all robot parameters 214 are input by the user 106A), some autonomy (e.g., the robot 112 plans its actions, but asks the user 106A for permission to execute), and a high autonomy (the robot plans and acts autonomously).

In an embodiment, the robot behavior 214B may be dynamic parameters of the robot 112 that may be changed during the course of the physical interaction. For example, these parameters may include a contact conformity 518D (e.g., how conformed the robot hand is to human's body part), a force 520D (e.g., how hard the touch is), a speed 522D (e.g., how fast the robot moves), a touch location 524D (e.g., the interaction location on human's body), a trajectory 526D (e.g., timings of motions and the number of robot waypoints), and a level of communication 528D (e.g., verbal and non-verbal communication such as gaze, facial expression, non-verbal gestures, and speech).

Figure 6:
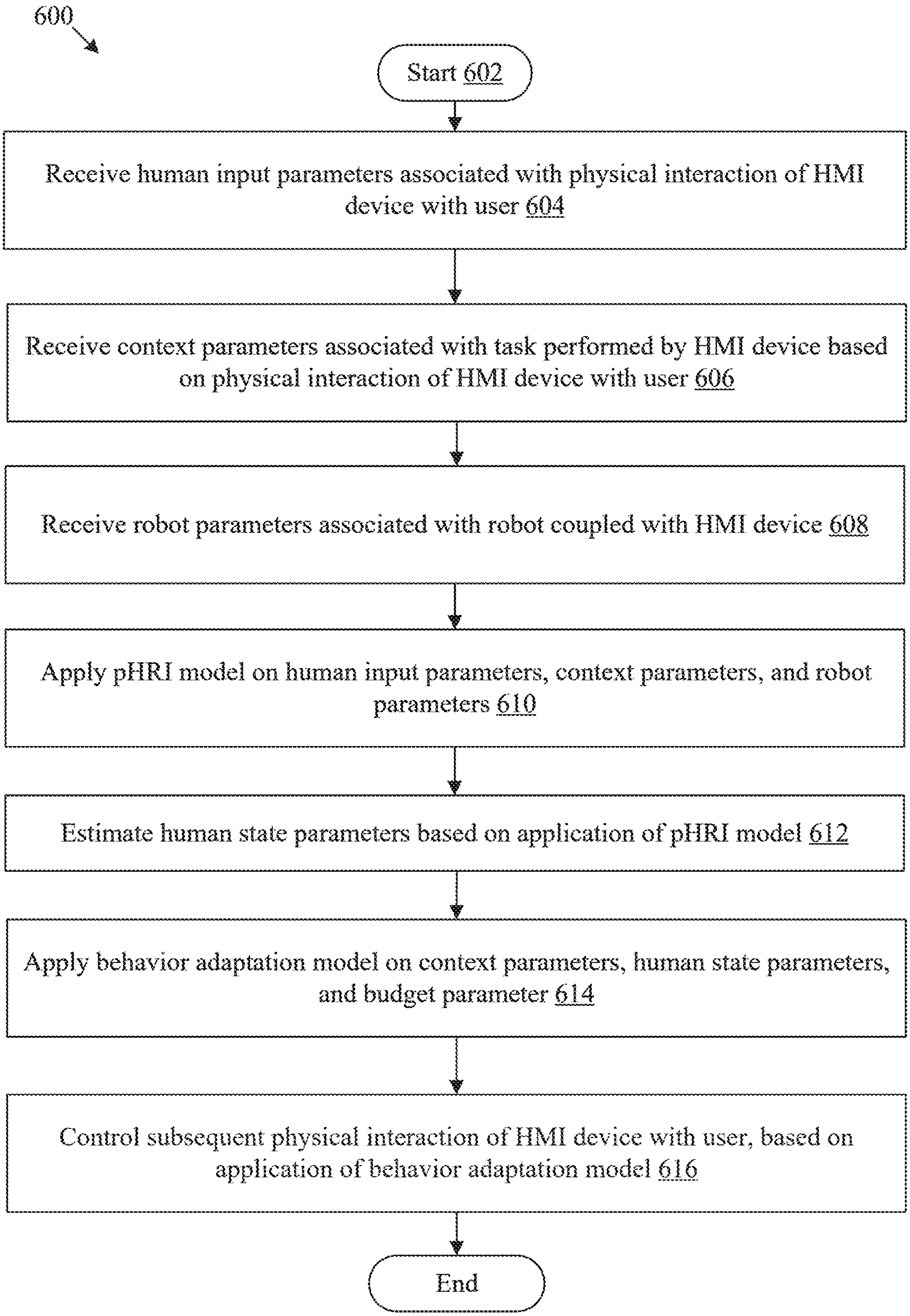
FIG. 6 is a flowchart that illustrates operations of an exemplary method for control of the HMI device based on the human state estimated from the pHRI, in accordance with an embodiment of the disclosure.

FIG. 6 is a flowchart that illustrates operations of an exemplary method for control of the HMI device based on the human state estimated from the pHRI, in accordance with an embodiment of the disclosure. FIG. 6 is explained in conjunction with elements from FIGS. 1-5. With reference to FIG. 6, there is shown a flowchart 600 that may include operations from 602 to 616 and may be implemented by the system 102 of FIG. 1. The flowchart 600 may start at 602 and proceed to 604.

At 604, the human input parameters 210 associated with the physical interaction of the HMI device 104 with the user 106A may be received. The circuitry 202 may be configured to receive the human input parameters 210 associated with the physical interaction of the HMI device 104 with the user 106A. The human input parameters 210 may include at least one of a human background associated with the user 106A, or a set of human responses of the user 106A to the physical interaction of the HMI device 104 with the user 106A. The reception of human input parameters is described further, for example, in FIG. 4 (at 402).

At 606, the context parameters 212 associated with the task performed by the HMI device 104 may be received, based on the physical interaction of the HMI device 104 with the user 106A. The circuitry 202 may be configured to receive the context parameters 212 associated with the task performed by the HMI device 104, based on the physical interaction of the HMI device 104 with the user 106A. The context parameters 212 associated with the task may include a task context or a level of emergency associated with the task. The reception of context parameters is described further, for example, in FIG. 4 (at 404).

At 608, the robot parameters 214 associated with the robot 112 coupled with the HMI device 104 may be received. The circuitry 202 may be configured to receive the robot parameters 214 associated with the robot 112 coupled with the HMI device 104. The robot parameters 214 associated with the robot 112 may include at least one of a set of robot attributes or a robot behavior associated with the robot 112. The reception of robot parameters is described further, for example, in FIG. 4 (at 406).

At 610, the physical human-robot interaction (pHRI) model 114 may be applied on the human input parameters 210, the context parameters 212, and the robot parameters 214. The circuitry 202 may be configured to apply the pHRI model 114 on the human input parameters 210, the context parameters 212, and the robot parameters 214. The application of the pHRI model is described further, for example, in FIG. 4 (at 408).

At 612, the human state parameters 216 may be estimated based on the application of the pHRI model 114. The circuitry 202 may be configured to estimate the human state parameters 216 based on the application of the pHRI model 114. The human state parameters 216 may include at least one of a level of perceived safety, a level of perceived comfort, or a level of perceived trust of the physical interaction for the user 106A. The estimation of human state parameters is described further, for example, in FIG. 4 (at 410).

At 614, the behavior adaptation model 116 may be applied to the context parameters 212, the human state parameters 216, and the budget parameter 218. The circuitry 202 may be configured to apply the behavior adaptation model 116 on the context parameters 212, the human state parameters 216, and the budget parameter 218. The behavior adaptation model 116 may be a regression model that learns the costs and benefits associated with each behavior of the robot 112 based on the human background, the task context, and current human state. The estimated costs and benefits of robot behaviors along with a budget value may be passed to a Knapsack-based optimization solver to generate behavior adaptations for robot communication behaviors and robot parameters. The recommended behaviors may then be executed and fed back into the pHRI model 114 for the next iteration. The behavior adaptation model 116 may be formulated as a Knapsack optimization problem that recommends robot behaviors based on the human background, the task context, and the current human state. The budget parameter 218 may include at least one of a time budget or a processing cost budget. The application of the behavior adaptation model is described further, for example, in FIG. 4 (at 412).

At 616, a subsequent physical interaction of the HMI device 104 with the user 106A may be controlled, based on the application of the behavior adaptation model 116. The circuitry 202 may be configured to control the subsequent physical interaction of the HMI device 104 with the user 106A, based on the application of the behavior adaptation model 116. The circuitry 202 may determine a set of instructions associated with the physical interaction, based on the received human input parameters, the context parameters, and the robot parameters. Thereafter, the circuitry 202 may transmit the instructions to the HMI device 104 to control an operation of the HMI device 104 and thereby control the subsequent physical interaction of the HMI device 104 with the user 106A. The control of the physical interaction of the HMI device 104 with the user 106A is described further, for example, in FIG. 4 (at 414). Control may pass to end.

Although the flowchart 600 is illustrated as discrete operations, such as 604, 606, 608, 610, 612, 614, and 616, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a system (e.g., the system 102 of FIG. 1). Such instructions may cause the system 102 to perform operations that may include reception of human input parameters (e.g., the human input parameters 210) associated with a physical interaction of a human-machine interface (HMI) device with a user (e.g., the user 106A). The operations may further include reception of context parameters (e.g., the context parameters 212) associated with a task performed by the HMI device 104, based on the physical interaction of the HMI device 104 with the user 106A. The operations may further include reception of the robot parameters (e.g., the robot parameters 214) associated with the robot 112 coupled with the HMI device 104. The operations may further include application of the pHRI model 114 on the human input parameters 210, the context parameters 212, and the robot parameters 214. The operations may further include estimation of the human state parameters 216 based on the application of the pHRI model 114. Also, the operations may further include application of the behavior adaptation model 116 on the context parameters 212, the human state parameters 216, and the budget parameter 218, and further controlling the physical interaction of the HMI device 104 with the user 106A, based on the application of the behavior adaptation model 116.

Exemplary aspects of the disclosure may provide a system (such as, the system 102 of FIG. 1) that includes circuitry (such as the circuitry 202). The circuitry 202 may be configured to receive human input parameters 210 associated with a physical interaction of a human-machine interface (HMI) device with a user 106A. Further the circuitry 202 may be configured to receive context parameters 212 associated with a task performed by the HMI device 104, based on the physical interaction of the HMI device 104 with the user 106A. Further the circuitry 202 may be configured to receive robot parameters 214 associated with the robot 112 coupled with the HMI device 104. Further, the circuitry 202 may be configured to apply a pHRI model 114 on the human input parameters 210, the context parameters 212, and the robot parameters 214. Further, the circuitry 202 may be configured to estimate human state parameters 216 based on the application of the pHRI model 114. Also, the circuitry 202 may be configured to apply the behavior adaptation model 116 on the context parameters 212, the human state parameters 216, and the budget parameter 218, and further controlling the physical interaction of the HMI device 104 with the user 106A, based on the application of the behavior adaptation model.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system, comprising:

circuitry configured to:

receive human input parameters associated with a physical interaction of a human-machine interface (HMI) device with a user;

receive context parameters associated with a task performed by the HMI device based on the physical interaction of the HMI device with the user;

receive robot parameters associated with a robot coupled with the HMI device;

apply a physical human-robot interaction (pHRI) model on the human input parameters, the context parameters, and the robot parameters;

estimate human state parameters based on the application of the pHRI model;

apply a behavior adaptation model on the context parameters, the human state parameters, and a budget parameter; and control a subsequent physical interaction of the HMI device with the user, based on the application of the behavior adaptation model.

2. The system according to claim 1, wherein the human input parameters include at least one of: a human background associated with the user, or a set of human responses of the user to the physical interaction of the HMI device with the user.

3. The system according to claim 2, wherein the human background associated with the user includes at least one of: an age of the user, a gender of the user, an ethnicity of the user, a physical condition of the user, or a robot familiarity including at least one of a robotics background or an interaction duration of the user.

4. The system according to claim 2, wherein the set of human responses of the user includes at least one of: a speech input of the user, a pitch of the speech input, a facial expression of the user, a gaze of the user, or a posture of the user.

5. The system according to claim 1, wherein the context parameters include at least one of: a task context associated with the task, or a level of emergency associated with the task.

6. The system according to claim 5, wherein the task context includes at least one of: an instrumental context associated with the task, or an affective context associated with the task.

7. The system according to claim 1, wherein the robot parameters include at least one of: a set of robot attributes associated with the robot, or a robot behavior associated with the robot.

8. The system according to claim 7, wherein the set of robot attributes includes at least one of: a form factor associated with the robot, a level of autonomy associated with the robot, or degrees of freedom associated with the robot.

9. The system according to claim 8, wherein the form factor associated with the robot includes at least one of: a size of the robot, a level of mobility of the robot, an appearance of the robot, a shape of the robot, or a skin type of the robot.

10. The system according to claim 7, wherein the robot behavior associated with the robot includes at least one of: a contact conformity of the robot, a force applied by the robot, a speed of the robot, a touch location of the robot on a body part of the user, a trajectory of motion of the robot, or a level of communication of the robot.

11. The system according to claim 1, wherein the human state parameters corresponds to at least one of: a level of perceived safety of the physical interaction for the user, a level of perceived comfort of the physical interaction for the user, or a level of perceived trust of the physical interaction for the user.

12. The system according to claim 1, wherein the behavior adaptation model corresponds to a dynamic programming model associated with a constrained knapsack optimization technique.

13. The system according to claim 1, wherein the behavior adaptation model is configured to: select a robot behavior based on the human state parameters and the budget parameter, wherein the control of the subsequent physical interaction of the HMI device is further based on the selected robot behavior.

14. The system according to claim 1, wherein the budget parameter includes at least one of a time budget or a processing cost budget.

15. A method, comprising:

in an electronic device:

receiving human input parameters associated with a physical interaction of a human-machine interface (HMI) device with a user;

receiving context parameters associated with a task performed by the HMI device based on the physical interaction of the HMI device with the user;

receiving robot parameters associated with a robot coupled with the HMI device;

applying a physical human-robot interaction (pHRI) model on the human input parameters, the context parameters, and the robot parameters;

estimating human state parameters based on the application of the pHRI model;

applying a behavior adaptation model on the context parameters, the human state parameters, and a budget parameter; and controlling a subsequent physical interaction of the HMI device with the user, based on the application of the behavior adaptation model.

16. The method according to claim 15, wherein the human input parameters include at least one of: a human background associated with the user, or a set of human responses of the user to the physical interaction of the HMI device with the user.

17. The method according to claim 15, wherein the context parameters include at least one of: a task context associated with the task, or a level of emergency associated with the task.

18. The method according to claim 15, wherein the robot parameters include at least one of: a set of robot attributes associated with the robot, or a robot behavior associated with the robot.

19. The method according to claim 15, wherein the human state parameters corresponds to at least one of: a level of perceived safety of the physical interaction for the user, or a level of perceived comfort of the physical interaction for the user, or a level of perceived trust of the physical interaction for the user.

20. A non-transitory computer-readable medium having stored thereon, computer-executable instructions that when executed by an electronic device, causes the electronic device to execute operations, the operations comprising:

receiving human input parameters associated with a physical interaction of a human-machine interface (HMI) device with a user;

receiving context parameters associated with a task performed by the HMI device based on the physical interaction of the HMI device with the user;

receiving robot parameters associated with a robot coupled with the HMI device;

applying a physical human-robot interaction (pHRI) model on the human input parameters, the context parameters, and the robot parameters;

estimating human state parameters based on the application of the pHRI model;

applying a behavior adaptation model on the context parameters, the human state parameters, and a budget parameter; and controlling a subsequent physical interaction of the HMI device with the user, based on the application of the behavior adaptation model.

* * * * *